(12) United States Patent
Kiyosawa

(10) Patent No.: US 9,152,846 B2
(45) Date of Patent: Oct. 6, 2015

(54) AUTHENTICATION APPARATUS THAT AUTHENTICATES OBJECT, AUTHENTICATION METHOD, AND STORAGE MEDIUM

(71) Applicant: CANON KABUSHIKI KAISHA, Tokyo (JP)

(72) Inventor: Kazuyoshi Kiyosawa, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 13/965,732

(22) Filed: Aug. 13, 2013

(65) Prior Publication Data

US 2014/0050373 A1    Feb. 20, 2014

(30) Foreign Application Priority Data

Aug. 20, 2012  (JP) ................................. 2012-181738

(51) Int. Cl.
*G06K 9/00* (2006.01)

(52) U.S. Cl.
CPC ........ *G06K 9/00268* (2013.01); *G06K 9/00288* (2013.01); *G06K 9/00926* (2013.01)

(58) Field of Classification Search
CPC ....... G06F 3/0604; H04L 47/70; H04L 67/22; G06K 15/4065; G06K 9/00523; G06K 9/00536; G06K 9/00771; G06K 9/00268; G06K 9/0028; G06N 99/005; G06Q 10/1097; G06Q 30/0201; G06Q 30/0623; G06Q 30/0641

USPC ................. 382/100, 115–123, 181, 190, 195; 235/380; 340/5.1–5.92; 704/200–257; 902/3; 707/705–731

See application file for complete search history.

(56) References Cited

U.S. PATENT DOCUMENTS

| | | | | |
|---|---|---|---|---|
| 5,715,325 | A * | 2/1998 | Bang et al. ..................... | 382/118 |
| 7,006,672 | B2 * | 2/2006 | Sato et al. ...................... | 382/118 |
| 7,120,278 | B2 * | 10/2006 | Sukegawa et al. ............. | 382/118 |
| 7,130,454 | B1 * | 10/2006 | Berube et al. .................. | 382/118 |
| 7,239,725 | B2 * | 7/2007 | Dobashi ......................... | 382/118 |
| 2003/0039380 | A1 * | 2/2003 | Sukegawa et al. ............. | 382/118 |
| 2006/0159370 | A1 * | 7/2006 | Tanaka et al. .................. | 382/305 |

FOREIGN PATENT DOCUMENTS

| | | |
|---|---|---|
| JP | 2008-146539 A | 6/2008 |
| JP | 2011-100229 A | 5/2011 |

* cited by examiner

*Primary Examiner* — Anand Bhatnagar
(74) *Attorney, Agent, or Firm* — Cowan, Liebowitz & Latman, P.C.

(57) ABSTRACT

An authentication apparatus capable of reducing erroneous authentication. A face detection section detects a face area of an object from an image. A feature information extraction processor extracts feature information (image data) indicative of a feature of the object. An authentication determination section performs authentication by comparing registered image data and feature information of a specific object. A registration information processor determines, when one of objects associated with registered image data items is selected as an object to which the feature information of the specific object is to be added, whether or not to additionally register the feature information of the specific object as image data for the selected object, according to a degree of similarity between image data of the selected object and the feature information of the specific object.

26 Claims, 14 Drawing Sheets

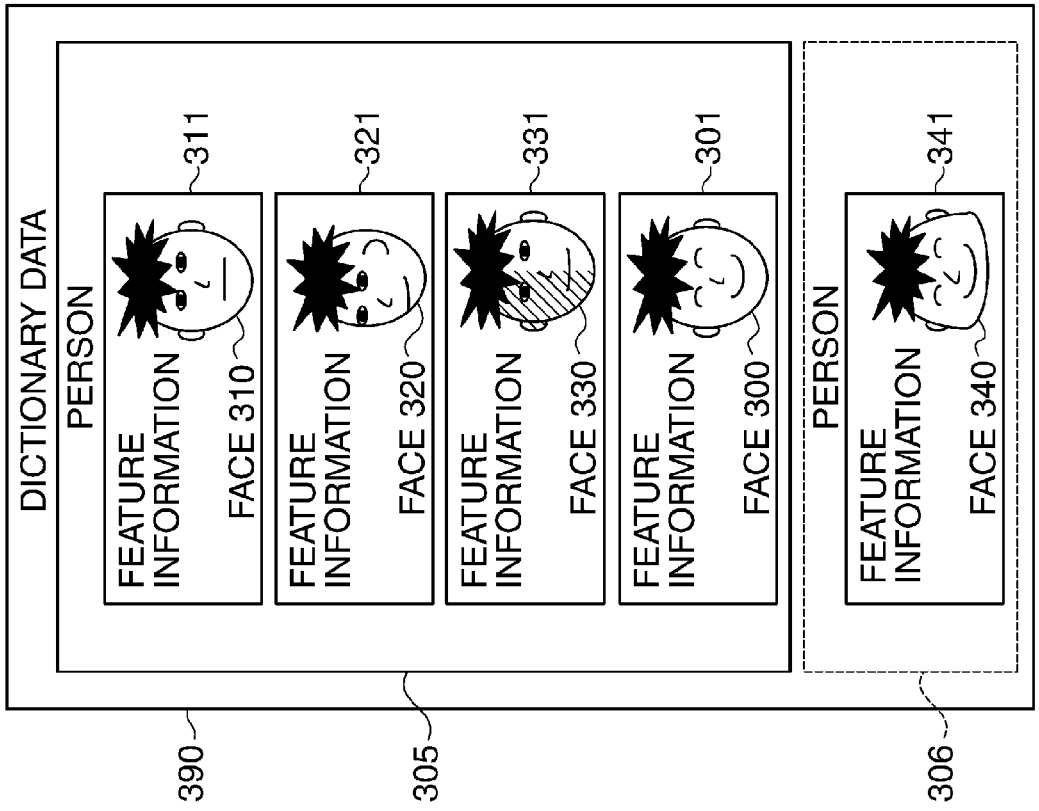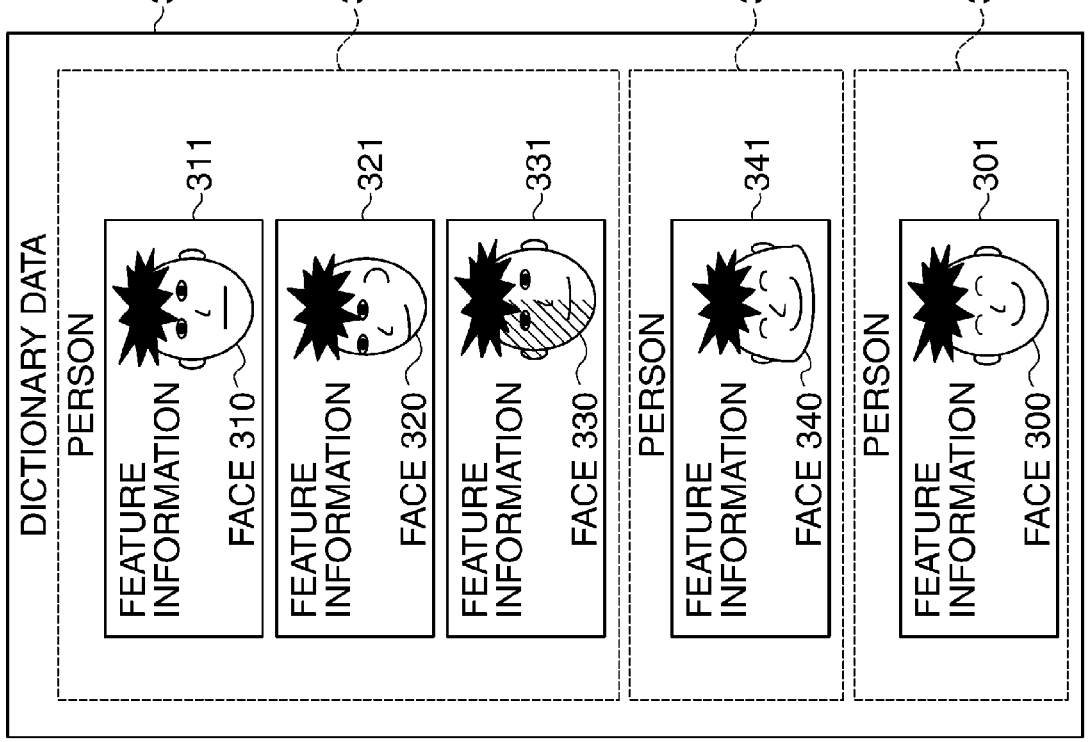

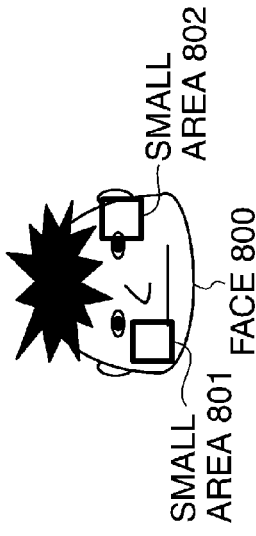
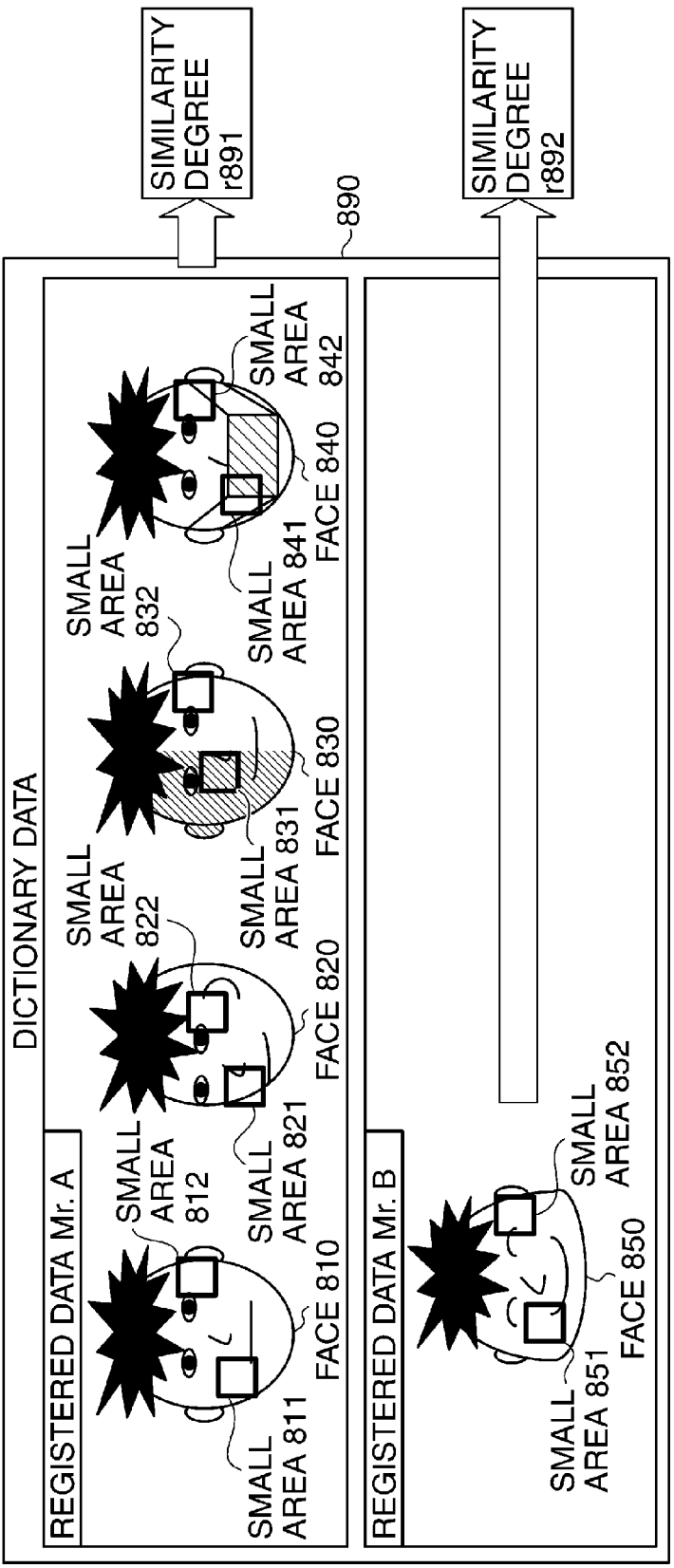
FIG.11A
FIG.11B

AUTHENTICATION APPARATUS THAT AUTHENTICATES OBJECT, AUTHENTICATION METHOD, AND STORAGE MEDIUM

BACKGROUND OF THE INVENTION

1. Field of the Invention

The present invention relates to an authentication apparatus, an authentication method, and storage medium for personal authentication, and more particularly to an authentication apparatus that performs personal authentication by checking input data against dictionary data stored in advance in a dictionary.

2. Description of the Related Art

In general, to perform personal authentication, authentication element data, such as faces, voices or fingerprints of a plurality of persons, are stored in advance in a dictionary as dictionary data. Then, the personal authentication is performed by comparing input data of an object to be authenticated and authentication element data items stored in the dictionary, and identifying an authentication element data item of a person which corresponds to the input data based on the result of the comparison.

In the personal authentication of this type, when a face image indicative of the face of a person is used as an authentication element data item, a face orientation and facial expressions of the face image, and a change in an optical environment when the face image is shot has large influence on the accuracy of the personal authentication. Here, the term "change in an optical environment" is intended to mean differences in light and shade caused by direct light, backlight, and side light, for example.

To perform personal authentication using a face image, there has been proposed a technique which uses auxiliary feature value data items formed by classifying, according to different shooting conditions, a plurality of feature value data items extracted from face image data of a plurality of persons, shot in the different shooting conditions (see Japanese Patent Laid-Open Publication No. 2008-146539). In this technique disclosed in Japanese Patent Laid-Open Publication No. 2008-146539, personal authentication is performed on a face image as input data with high accuracy using the auxiliary feature value data items, irrespective of the shooting environment of the face image.

Further, to accurately perform personal authentication even in environments different in shooting conditions, there has been proposed a technique which extracts corresponding part features between input patterns and registered patterns, which are registered in advance, and generates a plurality of combinations of the part features as combined part features (see Japanese Patent Laid-Open Publication No. 2011-100229). In this technique disclosed in Japanese Patent Laid-Open Publication No. 2011-100229, the degrees of similarity between the input patterns and the registered patterns are calculated using the combined part features, and personal authentication is executed according to the degrees of similarity.

However, in the method disclosed in Japanese Patent Laid-Open Publication No. 2008-146539, when it is taken into account that shooting conditions undergo complex changes including environmental changes, if auxiliary feature value data items as well are all stored as dictionary data for each of different shooting conditions including different environments which vary, burden of storage processing on the user becomes very heavy. Further, an increase in the amount of dictionary data causes an increase in time taken to execute processing for personal authentication. Furthermore, to create dictionary data, the user is required to know image shooting conditions.

Further, in the method disclosed in Japanese Patent Laid-Open Publication No. 2011-100229, combined part features are generated from part features corresponding between registered patterns and input patterns, and hence the calculated degree of similarity changes depending on the number of the registered patterns. This change in the degree of similarity sometimes causes erroneous authentication. More specifically, small areas of face images of the same person, stored as dictionary data, are sometimes displaced between the images, which can largely change features of the face images to cause erroneous recognition.

FIG. 10 is a diagram useful in explaining erroneous recognition caused by the conventional personal recognition method.

Now, let it be assumed that face images (hereinafter also simply referred to as the "faces") 701 to 704 are of the face of the same person. The feature of a small area 712 of the face 702 largely changes from the feature of a small area 711 of the face 701, due to a change in the orientation of the face. Further, in the case of a small area 713 of the face 703, light affects positioning of an organ detection position where an organ, such as eyes, a nose, or the like is detected for deciding the position of the small area 713, causing displacement of the organ detection position, so that the position of the small area 713 is displaced.

Further, in the case of a small area 714 of the face 704, the feature of the small area 714 is changed by an accessory, such as a mask 715 (or eyeglasses (not shown)).

As described above, when small areas of face images of the same person are displaced between the face images, the feature of the small area largely changes, which causes erroneous recognition.

FIGS. 11A and 11B are diagrams useful in explaining calculation of the degree of similarity, performed when face images of the same person shown in FIG. 10 are stored as dictionary data items indicative of a specific person.

In FIGS. 11A and 11B, the faces 701 to 704 shown in FIG. 10 are stored as data items of "Mr. A" in the dictionary data (here, they are shown as face images (hereinafter, also simply referred to as the "faces") 810 to 840). Further, let it be assumed here that a face image 850 is stored as an data item of "Mr. B" in the dictionary data, and the degree of similarity between a face image 800 of Mr. B as an object to be authenticated and an data item of the dictionary data is calculated.

Now, a small area 801 is set in the face image 800 as the object to be authenticated, and is compared with associated small areas 811 to 841 of the face images 810 to 840. As described above, there are displacements between the respective small areas 811 to 841 of the face images 810 to 840. When there are such displacements, the degree of similarity between any of the small areas 811 to 841 and the small area 801 sometimes becomes high.

Further, let it be assumed that when another small area 802 is set in the face image 800 as the object to be authenticated and is compared with respective corresponding small areas 812 to 842 of the face images 810 to 840, the degree of similarity between any of the small areas 812 to 842 and the small area 802 sometimes becomes high, similarly to the case of the small area 801, provided that there are displacements between the small areas 812 to 842.

To perform the personal authentication, small areas 851 and 852 are similarly set in the face image 850, and the face image 800 as the object to be authenticated and the face image 850 are also compared. In this case, a similarity degree r891, which is obtained by comparing the face image 800 with one of the face images 810 to 840 which are faces of a person other than the person of whom the face image 800 is picked up belongs can be sometimes larger than a similarity degree r892, which is obtained by comparing the face image 800 and a face image of the same person of whom the face image 800 is picked up. This causes a face image of another person to be erroneously authenticated as the face image 800.

More specifically, when the number of registered face images (i.e. dictionary data items) associated with the same person increases according to changes in shooting conditions and the like, not only the degree of similarity between the registered face images and a face image of the same person but also the degree of similarity between the registered face images and a face image of another person sometimes become high. This sometimes causes erroneous authentication.

SUMMARY OF THE INVENTION

The present invention provides an authentication apparatus and an authentication method which are capable of reducing erroneous authentication, and a storage medium.

In a first aspect of the present invention, there is provided an authentication apparatus that includes a storage section for storing image data items each indicative of a feature of a specific area of each of a plurality of objects, and authenticates an object in an image as a specific object, using the image data item, comprising a specific area detection unit configured to detect a specific area of the specific object from the image, a feature information extraction unit configured to extract a feature information item indicative of a feature of the specific area from the specific area of the specific object, an authentication unit configured to compare the image data item and the feature information item, to authenticate the specific object according to a result of the comparison, and a registration determination unit configured, before the feature information item of the specific object is additionally registered in the storage section as the image data item, if one of the plurality of objects is selected as a selected object to which the feature information item of the specific object is to be added, to determine whether or not to additionally register the feature information item of the specific object as an image data item of the selected object, according to a degree of similarity between the image data item of the selected object and the feature information item of the specific object, wherein the registration determination unit determines that the feature information item of the specific object is additionally registered as the image data item of the selected object when the degree of similarity between the image data item of the selected object and the feature information item of the specific object is larger than a registration threshold value set in advance, and wherein the registration threshold value changes according to a registration count of the image data items of the selected object.

In a second aspect of the present invention, there is provide a method of authentication performed by an authentication apparatus that includes a storage section for storing image data items each indicative of a feature of a specific area of each of a plurality of objects, and authenticates an object in an image as a specific object, using the image data item, comprising detecting a specific area of the specific object from the image, extracting a feature information item indicative of a feature of the specific area from the specific area of the specific object, comparing the image data item and the feature information item, to authenticate the specific object according to a result of the comparison, and determining, before the feature information item of the specific object is additionally registered in the storage section as the image data item, if one of the plurality of objects is selected as a selected object to which the feature information item of the specific object is to be added, whether or not to additionally register the feature information item of the specific object as an image data item of the selected object, according to a degree of similarity between the image data item of the selected object and the feature information item of the specific object, wherein said determining includes determining that the feature information item of the specific object is additionally registered as the image data item of the selected object when the degree of similarity between the image data item of the selected object and the feature information item of the specific object is larger than a registration threshold value set in advance, and wherein the registration threshold value changes according to a registration count of the image data items of the selected object.

In a third aspect of the present invention, there is provided a non-transitory computer-readable storage medium storing a computer-executable control program for causing a computer to execute a method of controlling an authentication apparatus that includes a storage section for storing image data items each indicative of a feature of a specific area of each of a plurality of objects, and authenticates an object in an image as a specific object, using the image data item, wherein the method comprises detecting a specific area of the specific object from the image, extracting a feature information item indicative of a feature of the specific area from the specific area of the specific object, comparing the image data item and the feature information item, to authenticate the specific object according to a result of the comparison, and determining, before the feature information item of the specific object is additionally registered in the storage section as the image data item, if one of the plurality of objects is selected as a selected object to which the feature information item of the specific object is to be added, whether or not to additionally register the feature information item of the specific object as an image data item of the selected object, according to a degree of similarity between the image data item of the selected object and the feature information item of the specific object, wherein said determining includes determining that the feature information item of the specific object is additionally registered as the image data item of the selected object when the degree of similarity between the image data item of the selected object and the feature information item of the specific object is larger than a registration threshold value set in advance, and wherein the registration threshold value changes according to a registration count of the image data items of the selected object.

According to the present invention, it is possible to reduce erroneous authentication.

Further features of the present invention will become apparent from the following description of exemplary embodiments with reference to the attached drawings.

BRIEF DESCRIPTION OF THE DRAWINGS

FIGS. 3A to 3D are diagrams useful in explaining registration of a face image data item as a dictionary data item in the dictionary data registration process shown in FIG. 2, in which FIG. 3A shows an example of the face image data item obtained by a feature information extraction processor, FIG. 3B shows examples of dictionary data items stored in a dictionary data storage section before execution of the dictionary data registration process, FIG. 3C shows examples of dictionary data items when the face image data item is stored as a new dictionary data item, and FIG. 3D shows examples of dictionary data items when the new dictionary data item is subjected to additional registration and stored.

FIGS. 7A to 7C are diagrams useful in explaining registration of a face image data item as a dictionary data item by the dictionary data registration process shown in FIG. 6, in which FIG. 7A shows an example of the face image data item obtained by the feature information extraction processor, FIG. 7B shows examples of dictionary data items stored in the dictionary data storage section before execution of the dictionary data registration process, and FIG. 7C shows examples of dictionary data items when a new person is added for registration of the face image data item and new classification information of the person is added to the face image data item of the new person.

FIGS. 8A and 8B are diagrams useful in explaining registration of a face image data item as a dictionary data item by the dictionary data registration process shown in FIG. 6, in which FIG. 8A shows examples of dictionary data items when the face image data item is stored in association with the existing classification information, and FIG. 8B shows examples of dictionary data items when the face image data item is stored in association with a new classification information item concerning a person already registered.

FIGS. 11A and 11B are diagrams useful in explaining calculation of degrees of similarity, performed when face images of the same person shown in FIG. 10 are stored as dictionary data items indicative of a specific person, in which FIG. 11A shows a face image of a person to be authenticated, and FIG. 11B shows registration data items (face images) of another person registered in the registration data, and a registration data item (face image) of the person to be authenticated.

DESCRIPTION OF THE EMBODIMENTS

The present invention will now be described in detail below with reference to the accompanying drawings showing embodiments thereof.

Figure 1:
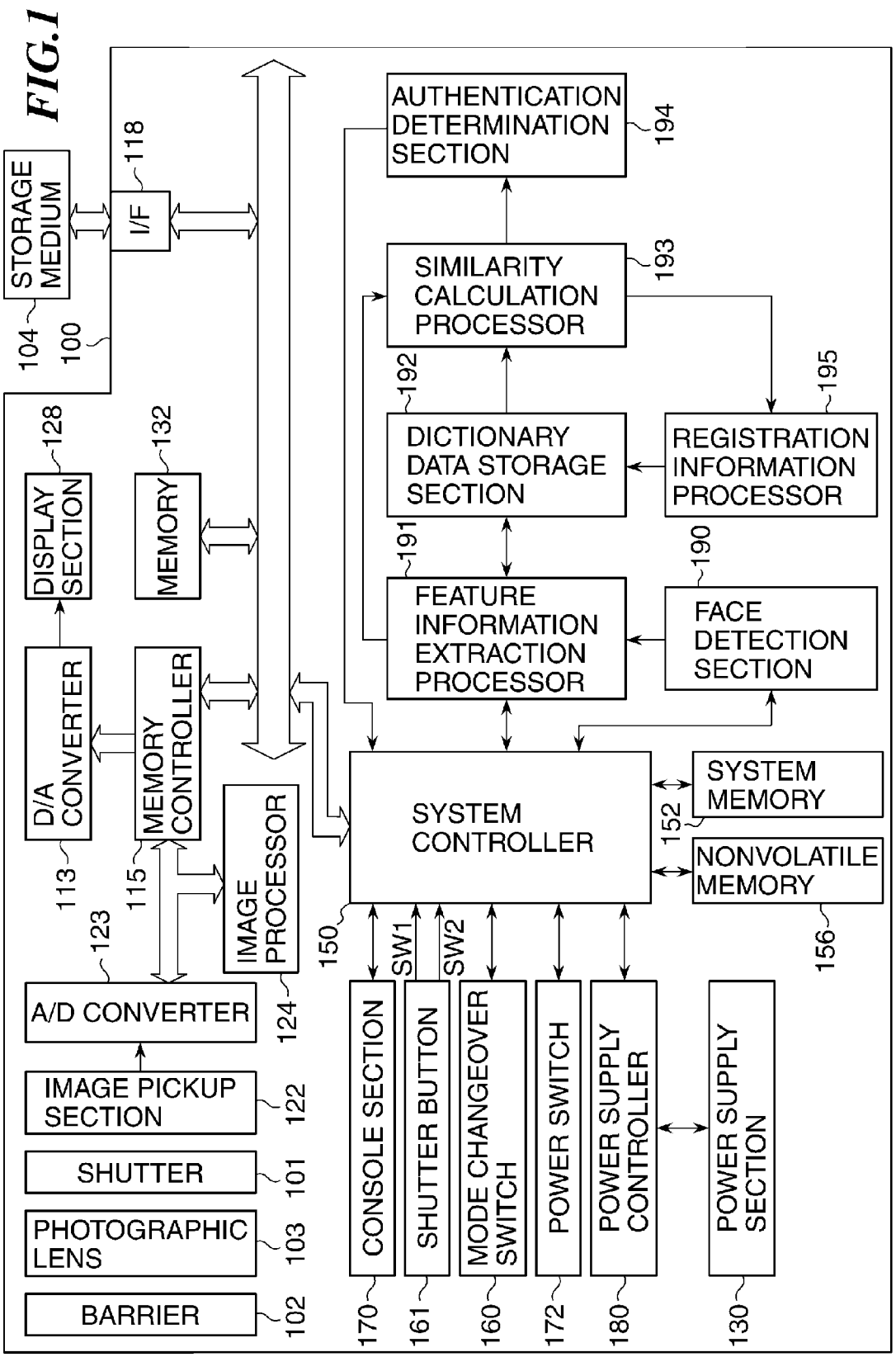
FIG. 1 is a block diagram of a digital camera which is an image pickup apparatus equipped with an authentication apparatus according to a first embodiment of the present invention.

FIG. 1 is a block diagram of an image pickup apparatus equipped with an authentication apparatus according to a first embodiment of the present invention.

Referring to FIG. 1, the illustrated image pickup apparatus is a digital camera (hereinafter simply referred to as the "camera") 100. The camera 100 has a photographic lens unit (hereinafter simply referred to as the "photographic lens") 103 including a focus lens. A shutter 101 with an aperture function is disposed downstream of the photographic lens 103.

An optical image (object image) having passed through the photographic lens 103 and the shutter 101 is formed on an image pickup section 122, which is an image pickup device. The image pickup section 122 is implemented by a CCD (charged coupled device) image sensor or a CMOS (complementary metal oxide semiconductor) image sensor, and delivers an electric signal (analog signal, i.e. image signal) according to the optical image. This analog signal is given to an analog-to-digital converter 123 so as to be converted to a digital signal (image data) by the analog-to-digital converter 123.

Note that a barrier 102 is disposed in the front of the photographic lens 103. The barrier 102 covers an image pickup system including the photographic lens 103, the shutter 101, and the image pickup section 122, such that the image pickup system is prevented from being soiled or damaged. An image processor 124 processes the image data output from the analog-to-digital converter 123 or image data given by a memory controller 115, for predetermined pixel interpolation, resizing, such as size reduction, and color conversion. Further, the image processor 124 performs predetermined computation processing using image data obtained through shooting by the camera 100.

A system controller 150 performs exposure control and range control based on the results of the computation. That is, the system controller 150 performs AF (auto-focus) processing, AE (automatic exposure) processing, and EF (electronic flash pre-emission) processing, based on a TTL (through the lens)-method.

Further, the image processor 124 performs predetermined computation processing using image data obtained through shooting by the camera 100, and performs TTL method-based AWB (automatic white balance) based on the results of the computation.

The image data output from the analog-to-digital converter 123 is written into a memory 132 via the image processor 124 and the memory controller 115 or via the memory controller 115. The memory 132 has not only the image data output from the analog-to-digital converter 123 written therein but also image data to be displayed on a display section 128 stored therein.

Note that the memory 132 has sufficient storage capacity to store a predetermined number of still image data items, a predetermined playback time length of moving image data items, and audio data. In addition, the memory 132 also plays the role of a memory (video memory) for image display.

A digital-to-analog converter 113 converts image data for image display, which is stored in the memory 132, to an analog image signal and deliver the analog image signal to the display section 128. This causes an image to be displayed according to the image data on the display section 128. Note that the display section 128 is a liquid crystal display device, for example.

A nonvolatile memory 156 is capable of performing electrical deletion and recording, and is implemented by an EEPROM, for example. The nonvolatile memory 156 stores constants, programs, etc., for use in operation of the system controller 150. The programs are provided for executing various processes, described hereinafter.

The system controller 150 controls the overall operation of the camera 100. The system controller 150 executes the above-described programs stored in the nonvolatile memory 156 to thereby perform the various processes, described hereinafter.

A system memory 152 is e.g. a RAM. The constants and variables for use in operation of the system controller 150, the programs read from the nonvolatile memory 156, and so forth are loaded into the system memory 152. Further, the system controller 150 controls the memory 132, the digital-to-analog converter 113, the display section 128, and so forth to thereby execute display control.

A mode changeover switch 160, a shutter button 161, and a console section 170 are input operation sections for inputting various operation instructions to the system controller 150. The shutter button 161 is used to give a shooting instruction, and includes a first shutter switch and a second shutter switch.

The mode changeover switch 160 is used to switch the operation mode of the system controller 150 between a still image recording mode, a moving image recording mode, a reproduction mode, and so forth.

When the shutter button 161 is operated to be brought to a so-called half pressed state, the first shutter switch is turned on (into a shooting preparation instruction state), whereby a first shutter switch signal SW1 is delivered to the system controller 150. Upon receipt of the first shutter switch signal SW1, the system controller 150 starts AF (auto focus) processing, AE (auto exposure) processing, AWB (auto white balance) processing, EF (electronic flash pre-emission) processing, and so forth.

When the shutter button 161 is brought to a so-called fully pressed state, the second shutter switch is turned on (into a shooting instruction state), whereby a second shutter switch signal SW2 is delivered to the system controller 150. Upon receipt of the second shutter switch signal SW2, the system controller 150 starts a sequence of shooting processing operations from reading of an image signal from the image pickup section 122 to writing of image data in a storage medium 104.

When one of various function icons displayed on the display section 128 is selectively operated, functions are suitably assigned, on a screen-by-screen basis, to operation members, such as buttons and keys, provided on the console section 170, whereby the operation members function as function buttons. Examples of the function buttons include a stop button, a return button, an image scroll button, a jump button, a narrow-down button, and an attribute change button.

For example, when a menu button is operated, a menu screen for use in configuring various settings is displayed on the display section 128, and a user can intuitively configure various settings, using the menu screen displayed on the display section 128 and a four-way button or a set button.

A power supply controller 180 includes a battery detection circuit, a DC-DC converter, and a switch circuit for use in switching between blocks to be supplied with electric power, and detects whether or not a battery is mounted, a type of the battery, and a remaining charge of the battery. Further, the power supply controller 180 controls the DC-DC converter based on detection results and instructions from the system controller 150 to supply a necessary voltage to each of the components including the storage medium 104 over a required time period.

A power supply section 130 includes e.g. a primary battery, such as an alkaline battery or a lithium battery, or a secondary battery, such as an NiCd battery, an NiMH battery, or an Li battery, as well as an AC adapter.

An interface (I/F) 118 is an interface with the storage medium 104, such as a memory card or a hard disk. When the storage medium 104 is a memory card, the memory card is formed e.g. by a semiconductor memory. A power switch 172 is used to power on or off the camera 100.

By the way, the camera 100 is capable of shooting using so-called central one-point AF or face AF. The central one-point AF is a method in which auto focus (AF) is performed on one point in the central part of an image pickup screen. On the other hand, the face AF is performed on a face area of the image pickup screen detected by a face-detecting function.

As shown in FIG. 1, a face detection section 190 is connected to the system controller 150, and detects edge portions of the eyes, mouth, and so forth of an object image from image data stored in the memory 132 to thereby detect a face area (i.e. feature portion) of the object image. More specifically, the face detection section 190 performs a face detection process for detecting a face area of an image data item according to an area (a face position and a face size) of the image data item occupied by a face, and a certainty (face reliability degree) of the face.

A feature information extraction processor 191 extracts feature information used for personal authentication from the face area detected by the face detection section 190. Here, the feature information required for personal authentication is e.g. a face image data item corresponding to the face area, and the face image data item is stored as dictionary data.

The feature information extraction processor 191 may be configured to normalize the size and orientation (in-plane rotation direction) of a face area of a face image data item, and then store the face image data item in a dictionary data storage section 192, referred to hereinafter, as a dictionary data item.

Further, in place of face image data items, only data items required for identification (recognition) may be stored in the dictionary data storage section 192 as dictionary data items. This makes it possible to reduce the amount of dictionary data. More specifically, small areas each having a center at an organ, such as each eye, a nose, and a mouth, may be set in the face area, and to perform identification by performing a vector correlation between the small areas, only the small areas (part areas) may be cut out in advance and stored as dictionary data items.

Note that generation of dictionary data is disclosed in the above-described Japanese Patent Laid-Open Publication No. 2011-100229, and hence description thereof is omitted here.

The dictionary data storage section 192 stores feature information items (face image data items) obtained by the feature information extraction processor 191 as dictionary data items. The dictionary data items are used for authentication determination. Person names (registered names) of persons concerning the feature information items are associated with the feature information items (face image data items).

Note that as described above, in the illustrated example, the dictionary data items are feature information items obtained by the feature information extraction processor 191, and dictionary data items concerning a plurality of persons (objects) are registered in the dictionary data storage section 192.

A similarity calculation processor 193 compares a feature information item of a person, obtained by the feature information extraction processor 191, and dictionary data items stored in the dictionary data storage section 192 using e.g. a pattern matching method. Then, the similarity calculation processor 193 calculates the degree of similarity between the feature information item and the dictionary data items.

An authentication determination section 194 compares the degree of similarity calculated by the similarity calculation processor 193 and an authentication threshold value set in advance. When the similarity degree is not smaller than the authentication threshold value, the authentication determination section 194 authenticates that the feature information (i.e. face image data) used for similarity degree calculation indicates a person associated with the dictionary data. That is, when the similarity degree is not smaller than the authentication threshold value, the authentication determination section 194 determines that the personal authentication is successful, and sends the determination result to the system controller 150.

When the dictionary data storage section 192 stores feature information, if the result of the calculation by the similarity calculation processor 193 indicates that the feature information is to be newly registered, a registration information processor 195 associates the feature information with a person name (registered name). Further, if the feature information is to be additionally registered for a person name, the registration information processor 195 determines whether or not the feature information is to be newly added to the person name, as will be described hereinafter.

Note that the configuration of the camera shown in FIG. 1 is only an example, that is, the configuration of the camera is not limited to this, but the camera may have any suitable configuration insofar as it is capable of performing processing, described hereinafter.

Next, a description will be given of a dictionary data registration process executed by the camera 100 shown in FIG. 1.

Figure 2:
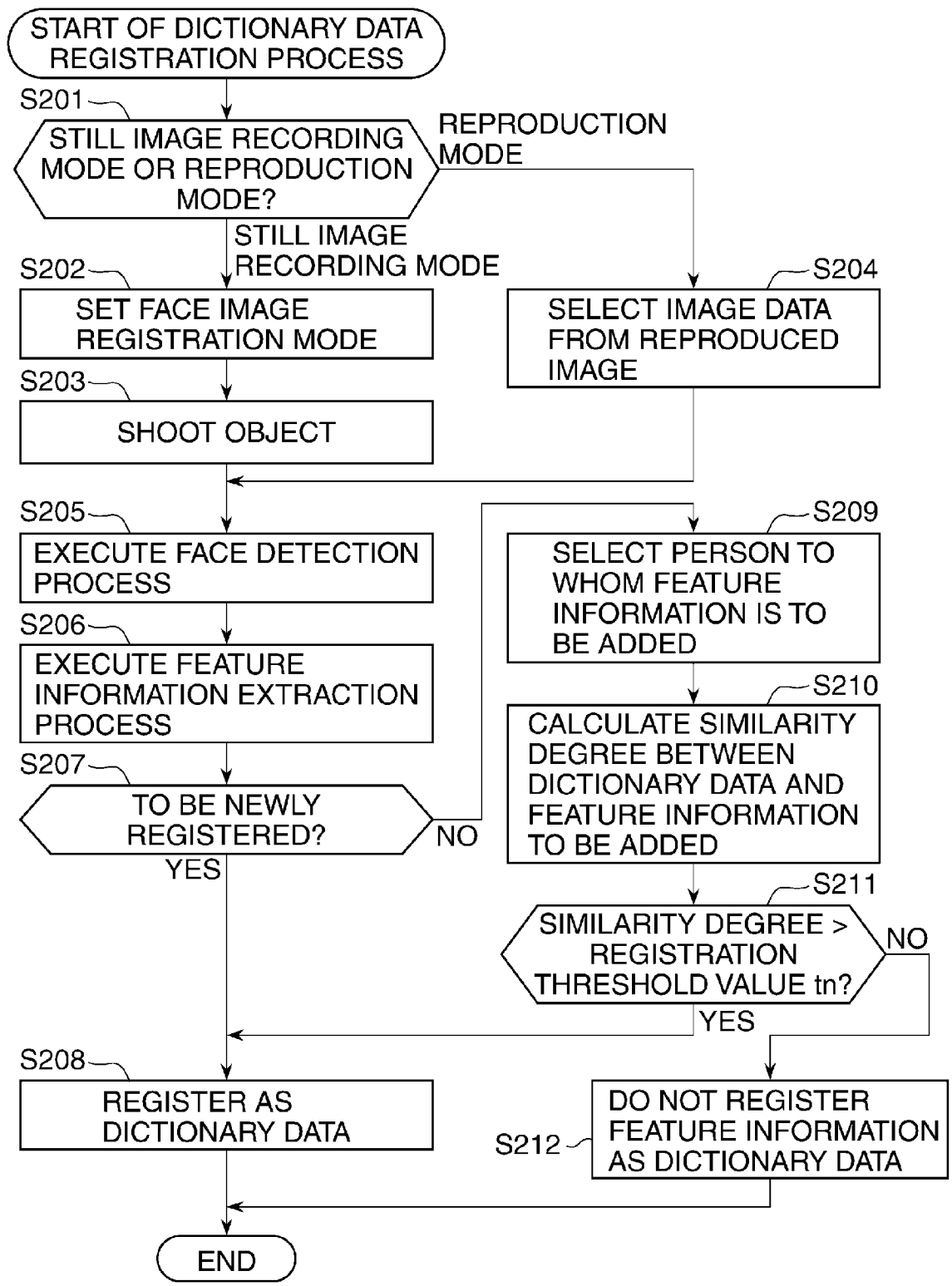
FIG. 2 is a flowchart of a dictionary data registration process executed by the digital camera shown in FIG. 1.

FIG. 2 is a flowchart of the dictionary data registration process executed by the camera 100 shown in FIG. 1.

When the user selects "dictionary data registration" by operating the console section 170, the system controller 150 starts the dictionary data registration process. Then, the system controller 150 controls the memory controller 115 to thereby cause the display section 128 to display a selection screen for selecting between the still image recording mode and the reproduction mode. The user selects one of the still image recording mode and the reproduction mode by operating the console section 170.

The system controller 150 determines whether the still image recording mode or the reproduction mode has been selected (step S201). If the still image recording mode has been selected, the system controller 150 sets a face image registration mode (step S202). Then, the system controller 150 causes the camera 100 to shoot an object (a person: a specific object), as described hereinabove (step S203), and obtains an image data item indicative of a result of the shooting.

On the other hand, if the reproduction mode has been selected, the system controller 150 reads out an image data item from the storage medium 104. In doing this, the system controller 150 reads out an image data item selected by the user on a selection screen displayed on the display section 128, from the storage medium 104 (step S204).

Following the step S203 or S204, a step S205 is executed wherein the system controller 150 transmits the image data item to the face detection section 190. The face detection section 190 performs the face detection process on the image data item to detect a face area (specific area) of a specific object (step S205). That is, the face detection section 190 uses an object in the image of the image data item as the specific object to thereby detect the face area (specific area) of the specific object (person).

Figure 3A:
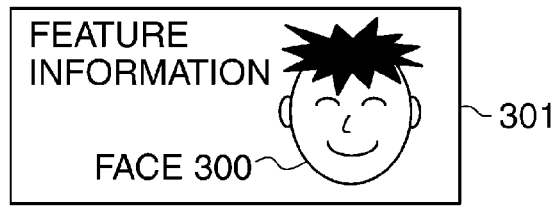
Figure 3B:
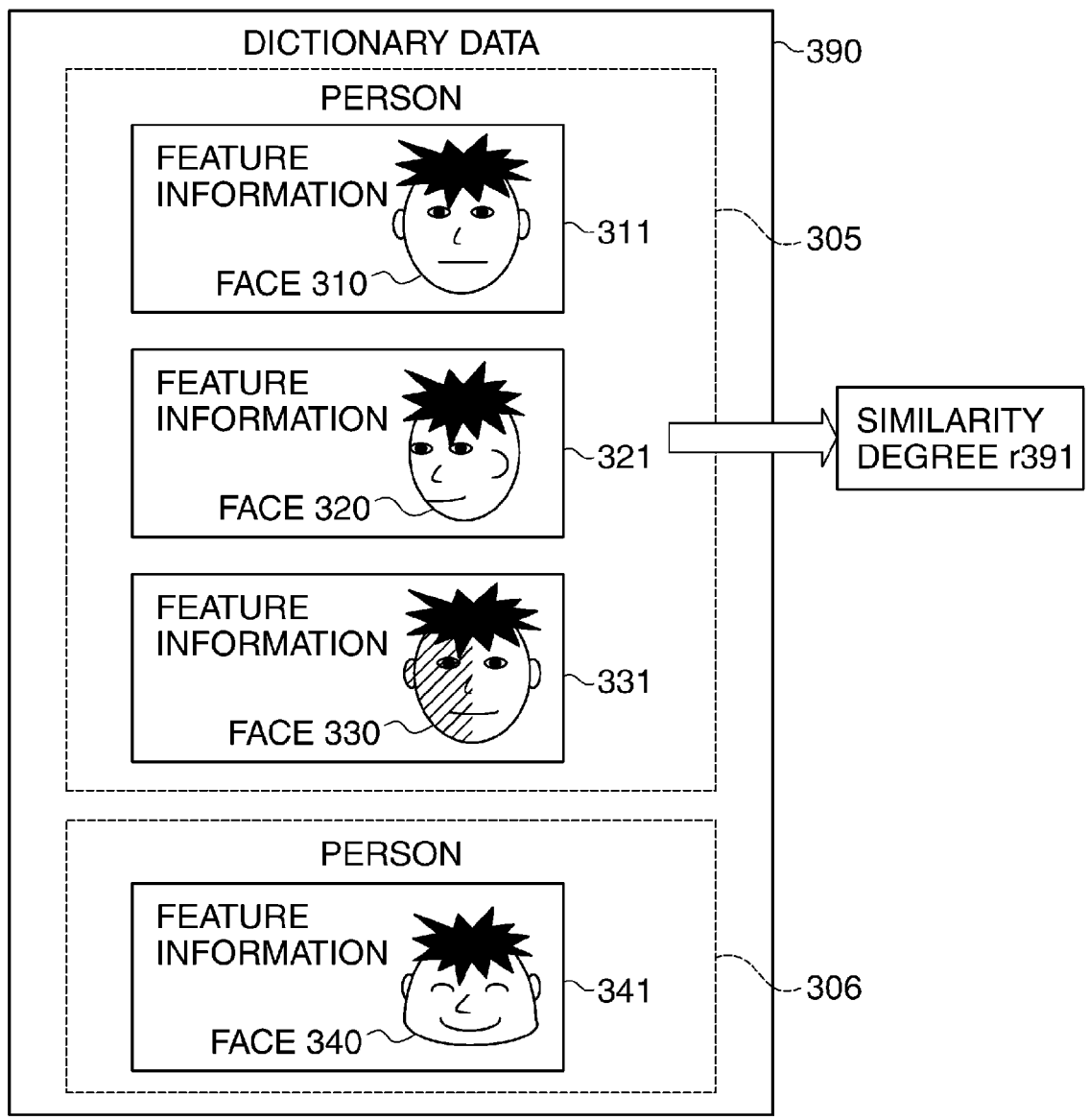

FIGS. 3A to 3D are diagrams useful in explaining registration of a face image data item as an item of dictionary data 390 in the dictionary data registration process shown in FIG. 2, in which FIG. 3A shows an example of the face image data item obtained by the feature information extraction processor 191, FIG. 3B shows examples of items of the dictionary data 390 stored in the dictionary data storage section 192 before execution of the dictionary data registration process, FIG. 3C shows examples of items of the dictionary data 390 when the face image data item is stored as a new dictionary data item, and FIG. 3D shows examples of items of dictionary data 390 when the new dictionary data item is subjected to additional registration and stored.

Now, let it be assumed that in the step S205, the face image data item (hereinafter also simply referred to as the "face") 300 shown in FIG. 3A has been detected. Then, the feature information extraction processor 191 extracts a feature information item 301 stored in the dictionary data storage section 192 from the face image data item 300 as an item of the dictionary data 390 (step S206).

Next, the system controller 150 receives the feature information item 301 from the feature information extraction processor 191, and receives dictionary data items from the dictionary data storage section 192 via the feature information extraction processor 191. Then, the system controller 150 causes face images indicated by the feature information item 301 and the dictionary data items to be displayed as a face image list on the display section 128 via the memory controller 115.

The user views the face image list, compares the face image indicated by the feature information item 301 and the face images indicated by the dictionary data items, and selects whether or not there is a face image (i.e. feature information) of the same person as a person indicated by the face 300.

Here, the dictionary data items shown in FIG. 3B are assumed to have been stored in the dictionary data storage section 192. In the example illustrated in FIG. 3B, feature information items 311 to 331 of a person 305 including faces 310 to 330 and a feature information item 341 of a person 306 including face 340 are stored as the dictionary data items.

Next, the system controller 150 determines whether or not the feature information item 301 is to be newly registered (step S207). When the user selects that there is no feature information of the same person as the person indicated by the face 300 (YES to the step S207), the system controller 150 determines that the feature information item 301 including the face 300 is to be newly registered.

When the system controller 150 notifies the feature information extraction processor 191 that new registration is to be executed, the feature information extraction processor 191 stores (registers) the feature information item 301 as a new dictionary data item in the dictionary data storage section 192 (step S208). Then, the system controller 150 terminates the dictionary data registration process.

When the new registration is performed as described above, the feature information item 301 including the face 300 is newly registered for a person 307 in the dictionary data storage section 192, as shown in FIG. 3C.

On the other hand, when the user selects that there is any feature information item of the same person as the person indicated by the face 300 (NO to the step S207), the system controller 150 determines that the feature information item 301 including the face 300 is to be additionally registered. Then, under the control of the system controller 150, the feature information extraction processor 191 selects dictionary data of a person selected by the user (i.e. a selected object) from the dictionary data items registered in the dictionary data storage section 192 (step S209).

Here, let it be assumed that the user selects the person 305 shown in FIG. 3B as the same person as the person indicated by the face 300. In this case, in the step S209, a set of dictionary data items associated with the person 305 who is the same person as the person indicated by the face 300 are selected from the dictionary data storage section 192.

Then, the similarity calculation processor 193 calculates the degrees of similarity between feature information (dictionary data) of the selected person 305 and the feature information item 301 of the face 300 (step S210). In the example illustrated in FIG. 3B, a similarity degree r391 is calculated according to each of the feature information items 311, 321, and 331 of the person 305 and the feature information item 301 of the face 300.

Next, the registration information processor 195 compares each of the similarity degrees calculated in the step S210 and a registration threshold value tn (n is an integer not smaller than 1), and determines whether or not the similarity degree is larger than the registration threshold value tn (step S211).

Figure 4:
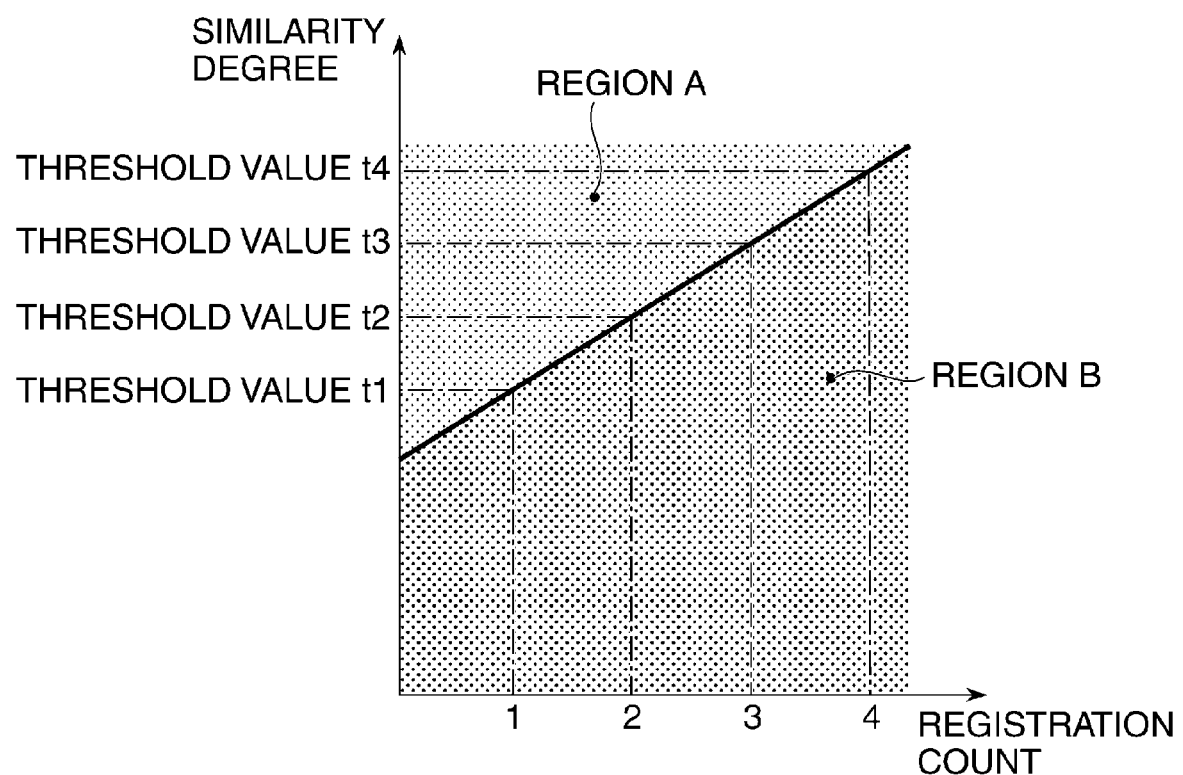
FIG. 4 is a diagram of an example of a registration threshold value used in the dictionary data registration process shown in FIG. 2.

FIG. 4 is a diagram of an example of the registration threshold value tn used in the dictionary data registration process shown in FIG. 2.

In the example illustrated in FIG. 4, n=4 holds, and registration threshold values are set in association with the registration counts of registered feature information items associated with the same person. Here, registration threshold values t1 to t4 are set in association with registration counts 1 to 4, respectively. The registration threshold values t1 to t4 are in the relationship of t1<t2<t3<t4. If the similarity degree is positioned in a region A shown in FIG. 4, the feature information item 301 is additionally registered in the dictionary data storage section 192 as an dictionary data item. On the other hand, if the similarity degree is positioned in a region B shown in FIG. 4, the feature information item 301 is not additionally registered in the dictionary data storage section 192.

That is, if the similarity degree is larger than the registration threshold value tn (YES to the step S211), the registration information processor 195 permits registration of the feature information item 301. As a consequence, in the step S208, the feature information item 301 is registered in the dictionary data storage section 192 as an dictionary data item.

On the other hand, if the similarity degree is not larger than the registration threshold value to (NO to the step S211), the registration information processor 195 inhibits registration of the feature information item 301. As a consequence, the feature information extraction processor 191 does not register the feature information item 301 in the dictionary data storage section 192 (step S212), followed by terminating the dictionary data registration process.

In the example illustrated in FIG. 3B, the feature information items 311 to 331 of the person 305 have already been stored, and hence the registration count of them is "3". Accordingly, in the present embodiment, when at least one of the similarity degrees calculated in the step S210 is larger than the registration threshold value t3, the feature information item 301 is additionally registered in the dictionary data storage section 192, whereas when all the similarity degrees calculated in the step S210 are equal to or smaller than the registration threshold value t3, the feature information item 301 is not additionally registered in the dictionary data storage section 192.

When the additional registration is performed, the dictionary data 390 registered in the dictionary data storage section 192 becomes as shown in FIG. 3D. Referring to FIG. 3D, for the person 305, in addition to the feature information items 311, 321, and 331, the feature information item 301 is registered as a dictionary data item.

Note that when the feature information item 301 is not additionally registered, in order to obtain an approval for not registering the item 301 from the user, the system controller 150 may cause the display section 128 to display e.g. a message saying that even if the feature information item 301 is additionally registered, it is not a valid image for use in personal authentication. Further, the feature information item 301 may be additionally registered in the dictionary data storage section 192, with a message added thereto saying that the feature information item 301 is not valid for personal authentication, thereby preventing the feature information item 301 from being used for personal authentication.

Further, although the registration threshold value to shown in FIG. 4 is indicated as a monotonically-increasing linear function in which the registration threshold value becomes larger as the registration count of feature information items of the same person increases, the registration threshold value is not limited to the example illustrated in FIG. 4, but it may be a non-linear function or a table.

Next, a description will be given of a personal authentication process executed by the camera 100 shown in FIG. 1.

Figure 5:
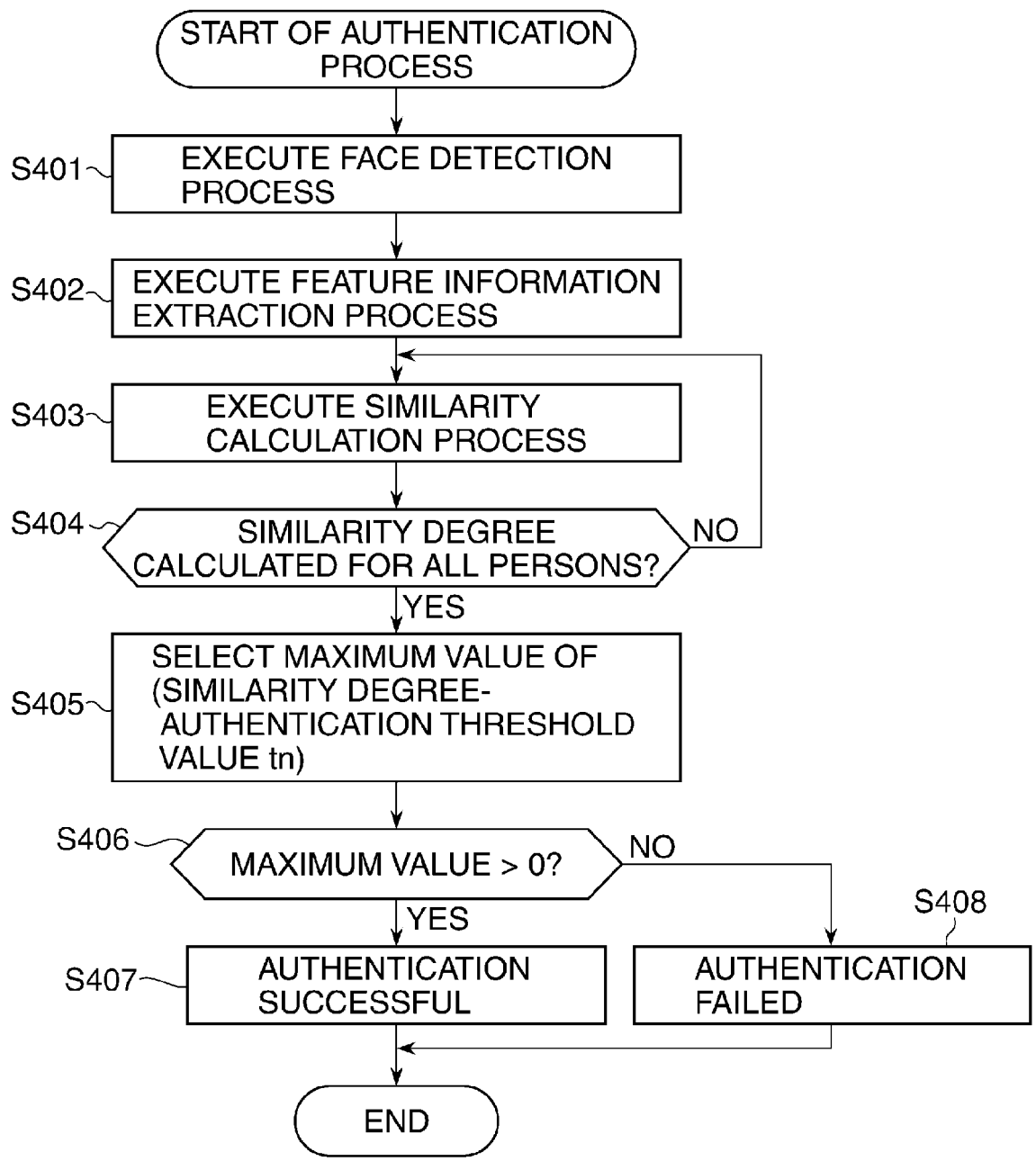
FIG. 5 is a flowchart of a personal authentication process executed by the camera shown in FIG. 1.

FIG. 5 is a flowchart of the personal authentication process executed by the camera 100 shown in FIG. 1.

When the user selects "personal authentication" by operating the console section 170, the system controller 150 starts the personal authentication process. Next, the system controller 150 transmits an image data item obtained through shooting to the face detection section 190.

The face detection section 190 performs the face detection process on the image data, to detect a face area of an object to be authenticated (step S401). Then, the feature information extraction processor 191 extracts feature information (to-be-authenticated object feature information, i.e. a face image data item) for use in personal authentication from image data of the face area of the object to be authenticated (step S402).

The similarity calculation processor 193 calculates the degrees of similarity between the to-be-authenticated object feature information and dictionary data items of persons registered in the dictionary data storage section 192 (step S403). Then, the similarity calculation processor 193 determines whether or not the degrees of similarity between the to-be-authenticated object feature information and the dictionary data items of all the persons registered in the dictionary data storage section 192 have been calculated (step S404).

If the degrees of similarity between the to-be-authenticated object feature information and the dictionary data items of all the persons registered in the dictionary data storage section 192 have not been calculated (NO to the step S404), the similarity calculation processor 193 returns to the step S403 to calculate the degree of similarity between a next dictionary data item and the to-be-authenticated object feature information.

On the other hand, if the degrees of similarity between the to-be-authenticated object feature information and the dictionary data items of all the persons registered in the dictionary data storage section 192 have been calculated (YES to the step S404), the authentication determination section 194 calculates a difference between each of the similarity degrees and the authentication threshold value tn, and selects a maximum value of the difference (step S405). Note that it is assumed that the authentication threshold value becomes larger as the registration count of feature information items (dictionary data items) of the same person increases, similarly to the above-described registration threshold value.

Next, the authentication determination section 194 determines whether or not the selected maximum value is larger than 0 (step S406). If the selected maximum value is larger than 0 (YES to the step S406), the authentication determination section 194 determines that the personal authentication is successful (step S407), and sends a result of the authentication to the system controller 150. The system controller 150 displays a face frame (not shown) indicating success of the personal authentication, in the face of the to-be-authenticated object displayed on the display section 128, according to the result of the authentication, followed by terminating the personal authentication process.

On the other hand, if the selected maximum value is not larger than 0 (NO to the step S406), the authentication determination section 194 sends a message saying that the personal authentication has failed (step S408). The system controller 150 terminates the personal authentication process without displaying the face frame (not shown) in the face of the to-be-authenticated object displayed on the display section 128 (i.e. while displaying failure of the personal authentication).

As described above, the similarity calculation processor 193 and the authentication determination section 194 compare dictionary data and feature data registered in the dictionary data storage section 192, and perform authentication of a person as a specific object according to a result of the comparison.

As described heretofore, in the first embodiment of the present invention, before a dictionary data item as a feature information item is registered in the dictionary data storage section 192, it is determined, with reference to a registration threshold value which varies with the registration count of feature information associated with the same person, whether or not the dictionary data item is to be registered. Therefore, even when the number of dictionary data items associated with the same person increases, it is possible to prevent the accuracy of the dictionary data indicative of the same person from being degraded. As a consequence, when personal authentication is performed by determining the degree of similarity using the dictionary data, it is possible to prevent a person from being erroneously authenticated as a person other than the person (another person).

Next, a description will be given of a camera 100 which is an image pickup apparatus equipped with an authentication apparatus according to the second embodiment of the present invention. Note that although the digital camera equipped with the authentication apparatus according to the second embodiment has the same configuration as that of the camera shown in FIG. 1, the second embodiment is distinguished from the first embodiment in the function of the registration information processor 195 appearing in FIG. 1.

In the second embodiment, when a feature information item is registered in the dictionary data storage section 192, the similarity calculation processor 193 calculates the degree of similarity between the feature information item of an object (person) to be registered and feature information items of the same person registered in the dictionary data storage section 192. Then, the registration information processor 195 compares the thus calculated similarity degree and a classification threshold value set in advance.

When the similarity degree is not smaller than the classification threshold value, the registration information processor 195 associates the same classification information as that of the feature information items used for calculation of the similarity degree, with the feature information item to be stored in the dictionary data storage section 192. Then, the registration information processor 195 classifies the feature information item into a group of the same classification information to thereby register the feature information item in the dictionary data storage section 192 as a dictionary data item.

On the other hand, when the similarity degree is smaller than the classification threshold value, the registration information processor 195 associates new classification information with the feature information item to be stored in the dictionary data storage section 192. This new classification information indicates that the feature information item is similar to the registered feature information items (dictionary data items), and is a kind of feature information.

Figure 6:
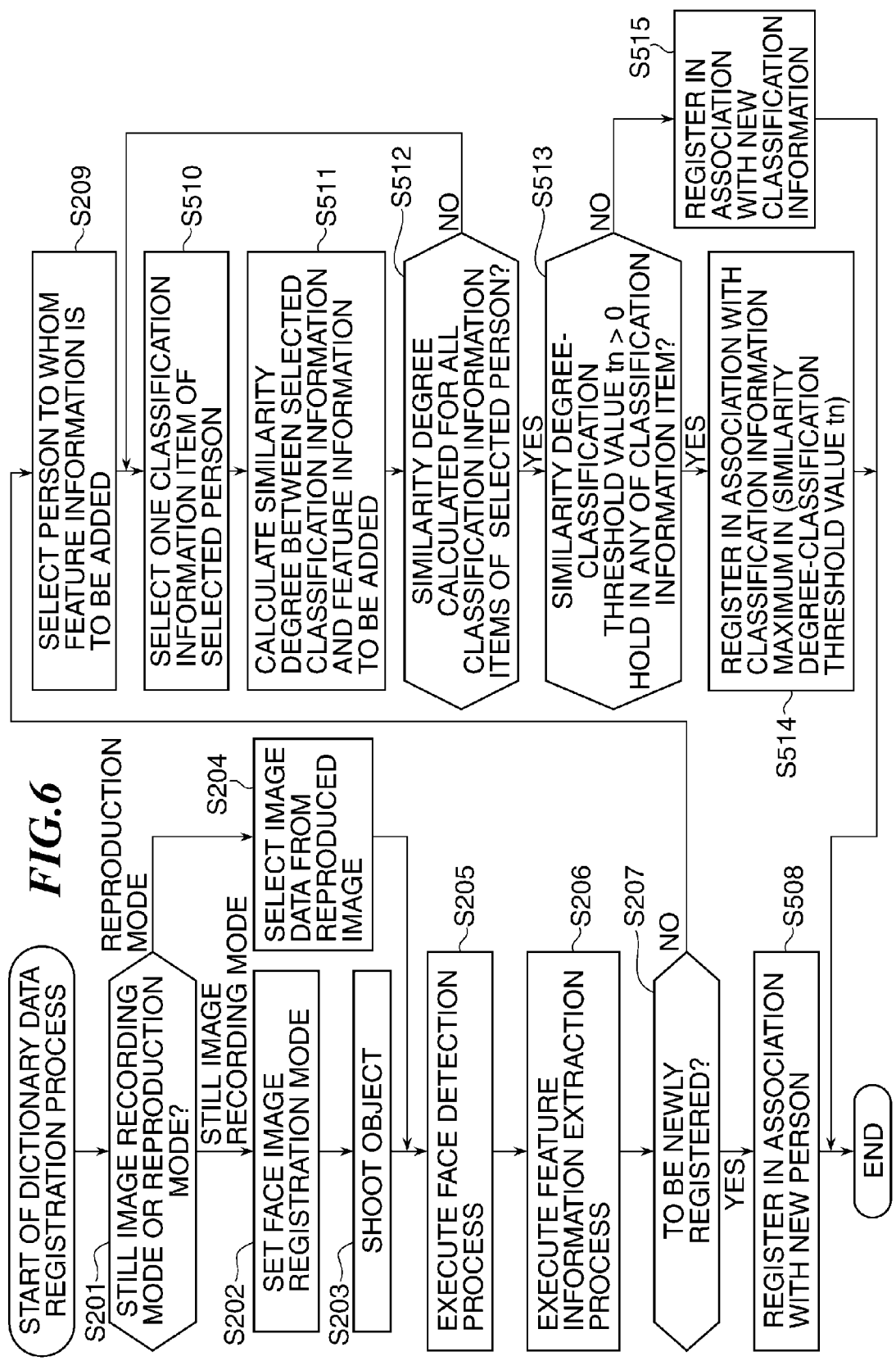
FIG. 6 is a flowchart of a dictionary data registration process which is executed by a camera which is an image pickup apparatus equipped with an authentication apparatus according to a second embodiment of the present invention.

FIG. 6 is a flowchart of a dictionary data registration process which is executed by the camera 100 which is the image pickup apparatus equipped with the authentication apparatus according to the second embodiment. In the flowchart shown in FIG. 6, the same steps as appearing in FIG. 2 are denoted by the same reference numerals and description thereof is omitted.

Figure 7A:
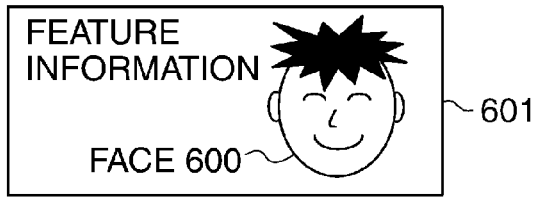
Figure 7B:
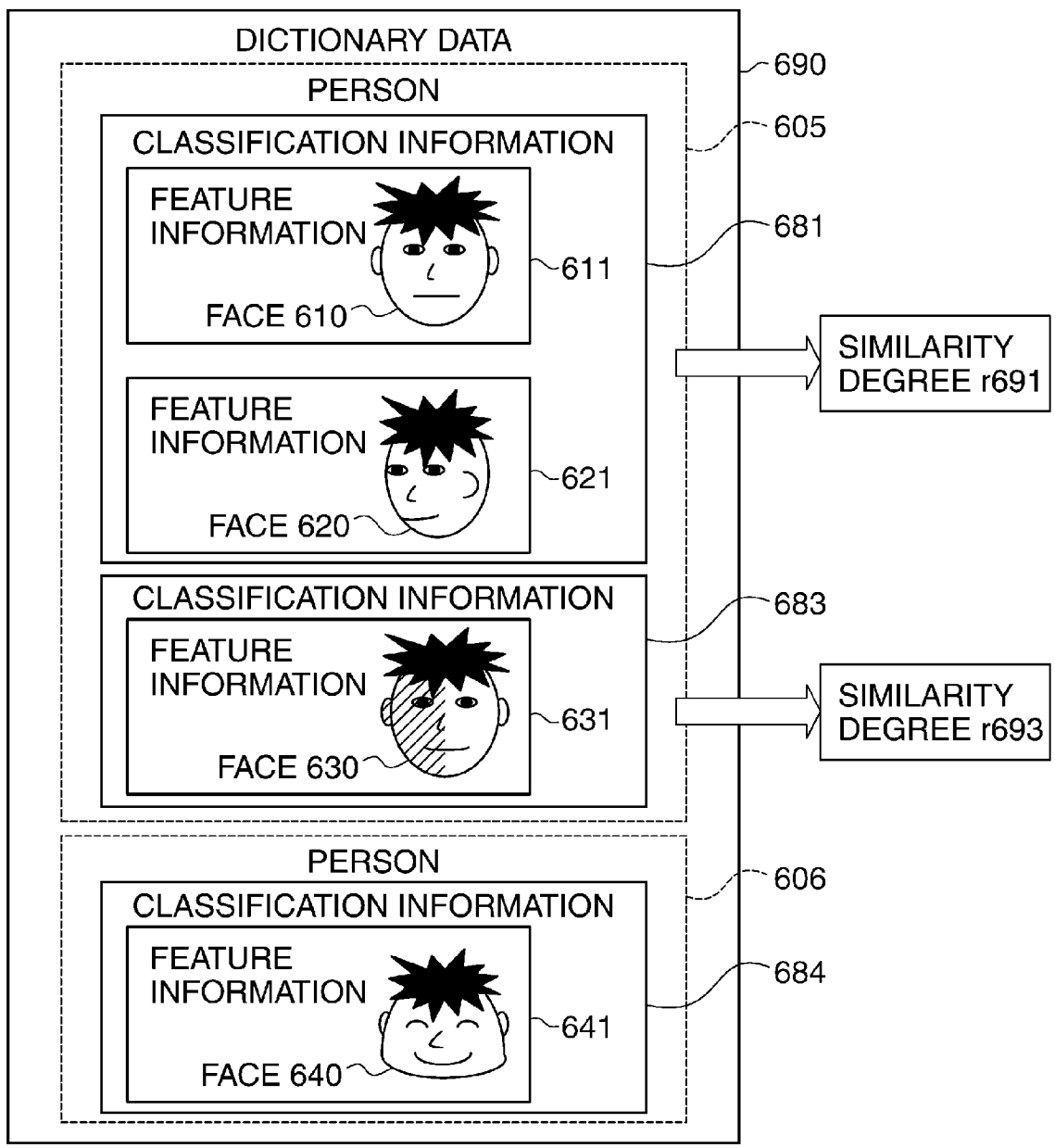
Figure 7C:
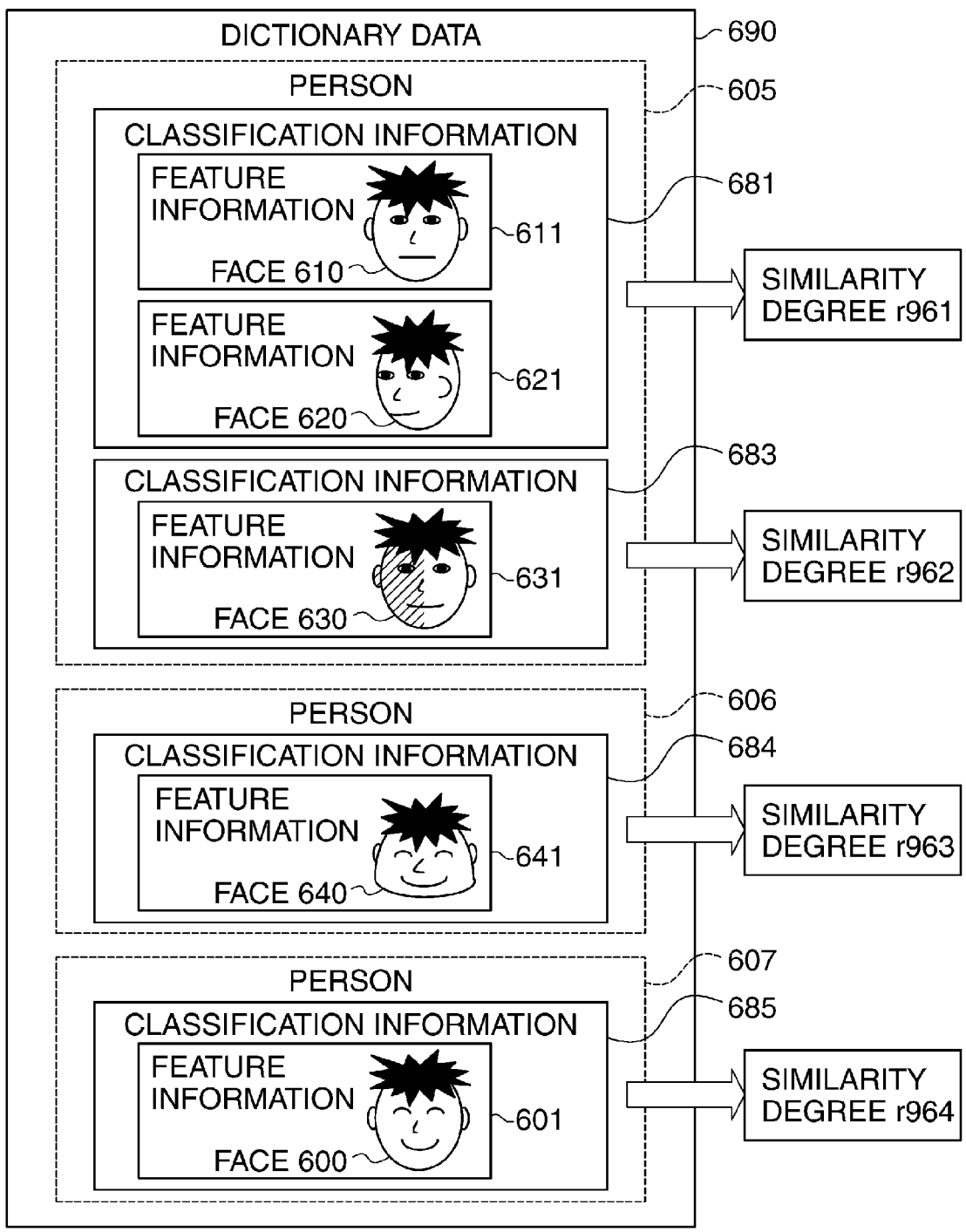
Figure 8A:
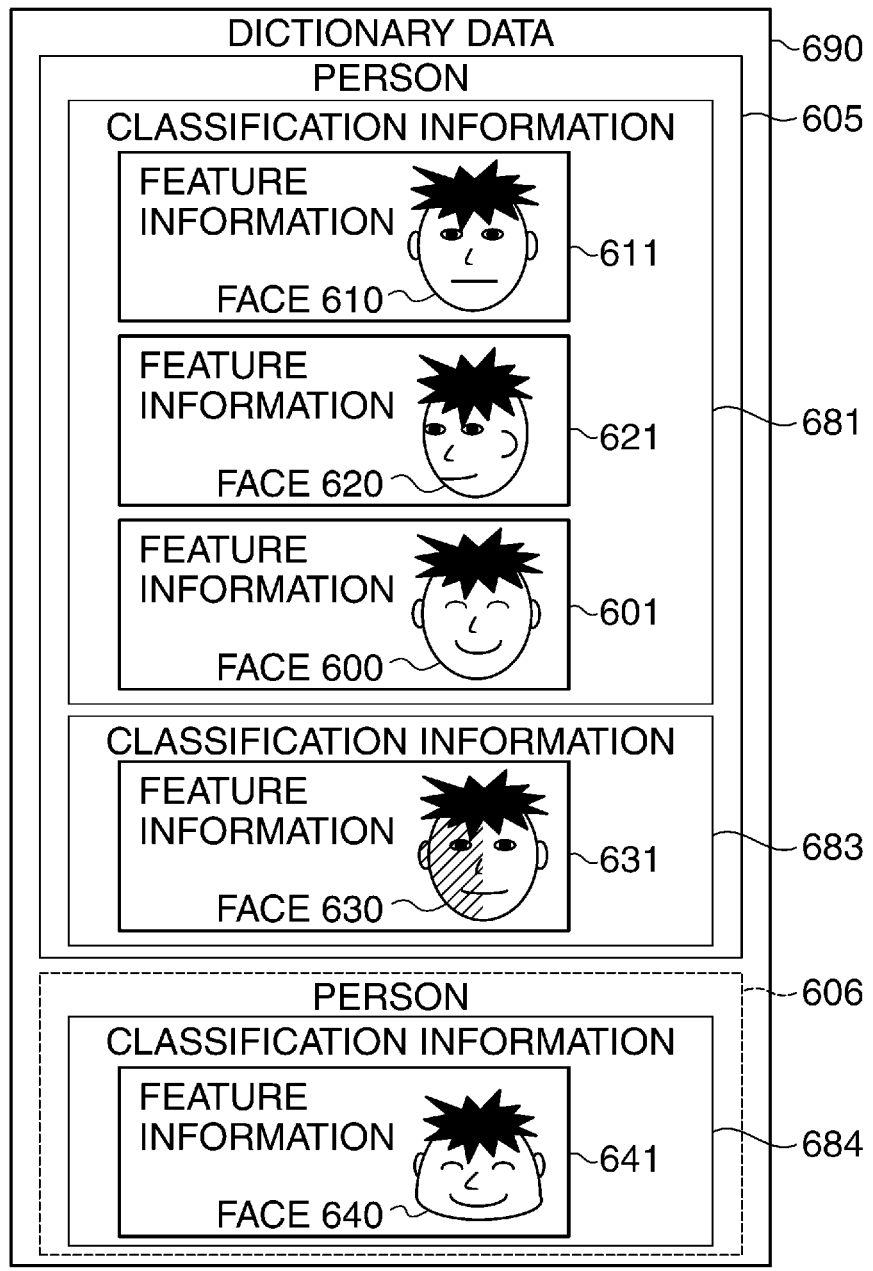
Figure 8B:
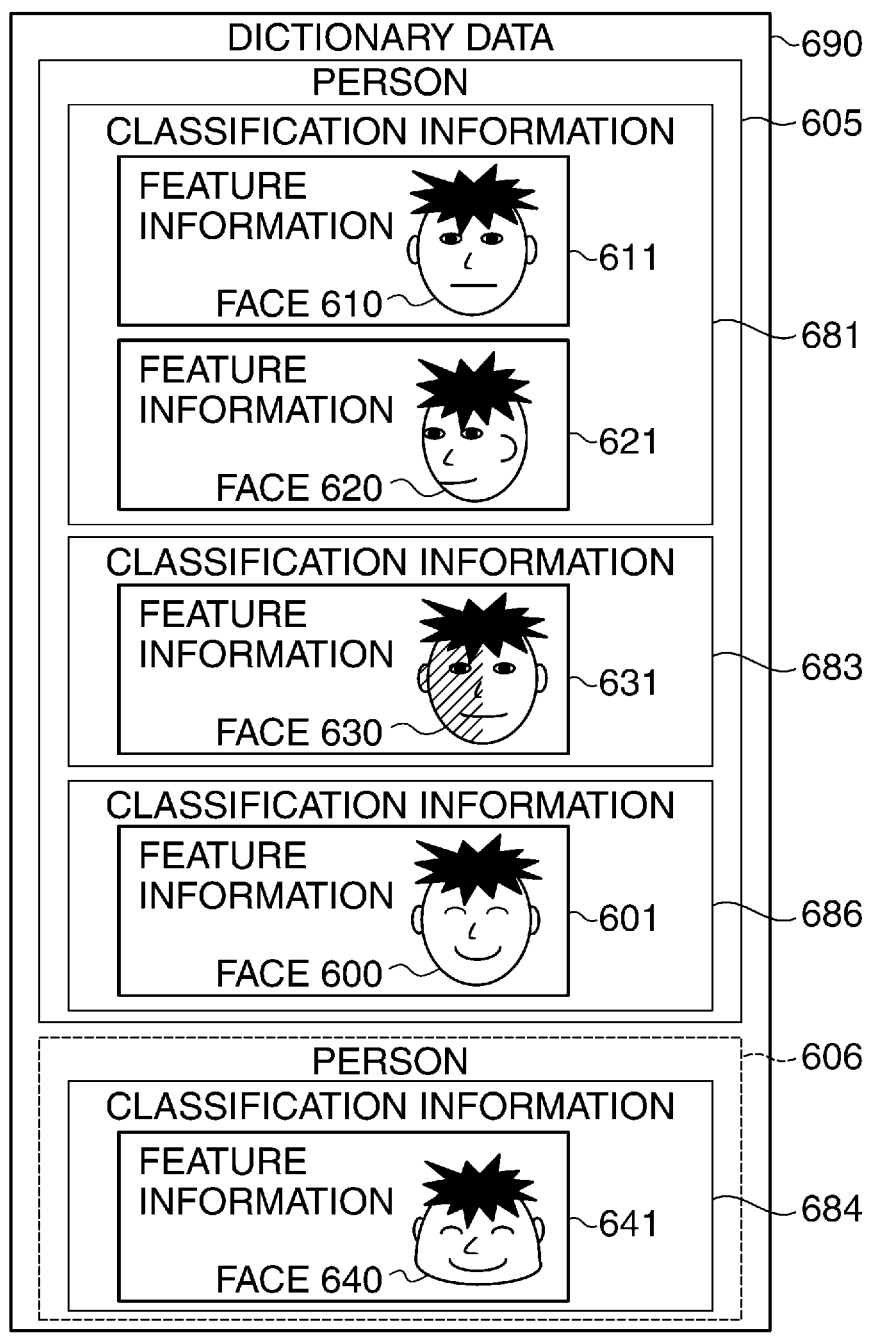

FIGS. 7A to 7C and 8A and 8B are diagrams useful in explaining registration of a face image data item as an item of dictionary data 690 by the dictionary data registration process shown in FIG. 6, in which FIG. 7A shows an example of the face image data item obtained by the feature information extraction processor 191, FIG. 7B shows examples of items of the dictionary data 690 stored in the dictionary data storage section 192 before execution of the dictionary data registration process, and FIG. 7C shows examples of items of dictionary data 690 when a new person is added for registration of the face image data item and new classification information of the person is added to the face image data item of the new person. Further, FIG. 8A shows examples of items of the dictionary data 690 when the face image data item is stored in association with the existing classification information, and FIG. 8B shows examples of items of the dictionary data 690 when the face image data item is stored in association with a new classification information item concerning a person already registered.

Now, let it be assumed that a face image data (face) 600 shown in FIG. 7A has been detected in the step S205, and in the step S206, the feature information extraction processor 191 has extracted a feature information item 601 to be stored in the dictionary data storage section 192 from the face image data 600.

The dictionary data items shown in FIG. 7B are assumed to have been stored in the dictionary data storage section 192. In the example illustrated in FIG. 7B, feature information items 611 to 631 of a person 605 including faces 610 to 630, and a feature information item 641 of a person 606 including a face 640 are stored as the dictionary data items. Further, a classification information item 681 is added to the feature information items 611 and 621, and a classification information item 683 is added to the feature information item 631. Furthermore, a classification information item 684 is added to the feature information item 641.

When it is determined in the step S207 that the feature information item 601 including the face 600 is to be newly registered, the feature information extraction processor 191 registers the feature information item 601 including the face 600 as feature information for a person newly registered. Next, the registration information processor 195 associates person name (registered name) information for identifying the person and new classification information dependent on the above-described similarity degree with the feature information item 601. Next, the feature information extraction processor 191 registers the feature information item 601 in the dictionary data storage section 192 (step S508), followed by terminating the dictionary data registration process.

When the new registration is performed as described above, as shown in FIG. 7C, the feature information item 601 including the face 600 is newly registered for a person 607 in the dictionary data storage section 192. At this time, a classification information item 685 is associated with the feature information item 601 according to the similarity degree.

On the other hand, when it is determined in the step S207 that the feature information item 601 including the face 600 is not to be newly registered, as described with reference to FIG.

2, in the step S209, the feature information extraction processor 191 selects dictionary data of a person selected by the user from the dictionary data items registered in the dictionary data storage section 192, under the control of the system controller 150.

Here, let it be assumed that the user selects the person 605 shown in FIG. 7B as the same person as the person indicated by the face 600. Therefore, in the step S209, dictionary data items associated with the person 605 who is the same person as the person indicated by the face 600 are selected from the dictionary data storage section 192.

Subsequently, the similarity calculation processor 193 selects one of the classification information items associated with the person 605 (step S510). Here, the similarity calculation processor 193 is assumed to have selected the classification information item 681 from the classification information items 681 and 683 associated with the person 605.

The similarity calculation processor 193 calculates the degrees of similarity between the feature information items 611 and 621 associated with the selected classification information item 681, and the feature information item 601 (step S511). In the example illustrated in FIG. 7B, a similarity degree r691 is calculated according to the classification information item 681 and the feature information item 601.

Next, the similarity calculation processor 193 determines whether or not the degrees of similarity between feature information items associated with all classification information items concerning the person 305 and the feature information item 601 have been calculated (step S512). If it is determined that the degrees of similarity between the feature information items associated with all the classification information items concerning the person 305 and the feature information item 601 have not been calculated (NO to the step S512), the similarity calculation processor 193 returns to the step S510 to select a next classification information item, and then in the step S511, calculates the degrees of similarity between feature information associated with the next classification information and the feature information item 601.

In the example illustrated in FIG. 7B, a similarity degree r693 between the feature information item 601 of the face 600 and classification information 683 associated with the person 605 is calculated.

If it is determined that the degrees of similarity between the feature information items associated with all the classification information items concerning the person 305 and the feature information item 601 have been calculated (YES to the step S512), the registration information processor 195 compares each of the similarity degrees calculated in the step S511 and the classification threshold value (step S513).

Note that the classification threshold value is assumed to become larger as the number of feature information items associated with an classification information item of the same person increases, similarly to the registration threshold value described above with reference to FIG. 4. For example, in the example illustrated in FIG. 7B, two feature information items 611 and 621 are registered in a manner associated with the classification information item 681, and hence the degree of similarity between the feature information item 601 and each of the feature information items 611 and 621 associated with the classification information item 681 is compared with a classification threshold value t2 (see FIG. 4). Further, since only the feature information item 631 is registered in a manner associated with the classification information item 683, the degree of similarity between the feature information item 601 and the feature information item 631 associated with the classification information item 683 is compared with a classification threshold value t1 (see FIG. 4).

In the step S513, if the degree of similarity between a feature information item associated with any of the classification information items and the feature information item 601 is larger than the classification threshold value (YES to the step S513), the registration information processor 195 associates one of the any of the classification information items, which is associated with a feature information item maximum in the difference between the similarity degree and the classification threshold value, with the feature information item 601 (step S514). After that, the feature information extraction processor 191 registers the feature information item 601 in the dictionary data storage section 192 as a dictionary data item, followed by terminating the dictionary data registration process.

On the other hand, if the degree of similarity between all feature information items associated with each of the classification information items and the feature information item 601 are equal to or smaller than the classification threshold value (NO to the step S513), the registration information processor 195 associates a new classification information item with the feature information item 601 (step S515). Then, the feature information extraction processor 191 registers the feature information item 601 in the dictionary data storage section 192 as a dictionary data item, followed by terminating the dictionary data registration process.

In the example illustrated in FIG. 7B, if at least [(the similarity degree between the feature information item 601 and each feature information item associated with the classification information item 681)—the classification threshold value t2]>0 or [(the similarity degree between the feature information item 601 and each feature information item associated with the classification information item 683)—the classification threshold value t1]>0 holds, the process proceeds to the step S514, wherein out of classification information items which satisfy the condition that [a similarity degree between the feature information item 601 and each feature information associated with therewith—the classification threshold value tn]>0, a classification information item associated with a feature information item which is maximum in the difference between the similarity degree and the classification threshold value tn is associated with the feature information item 601.

On the other hand, if there is no classification information item which satisfies the condition that [a similarity degree between the feature information item 601 and each feature information associated with therewith—the classification threshold value tn]>0, the process proceeds to the step S515, wherein a new classification information item is associated with the feature information item 601 for the person 605.

Now, assuming that the similarity degree r691 shown in FIG. 7B is maximum in the value of (the similarity degree—the classification threshold value t2), the feature information item 601 is registered in the dictionary data storage section 192, as shown in FIG. 8A. That is, the classification information item 681 used for calculation of the similarity degree r691 is associated with the feature information item 601, and the feature information item 601 is registered in the dictionary data storage section 192.

On the other hand, if neither of the similarity degrees r691 and r693 satisfies the condition that (the similarity degree—the classification threshold value tn)>0, the feature information item 601 is registered in the dictionary data storage section 192, as shown in FIG. 8B. That is, a new classification information item 686 associated with the person 605, who is selected as the same person, is associated with the feature information item 601, and the feature information item 601 is registered in the dictionary data storage section 192.

Figure 9:
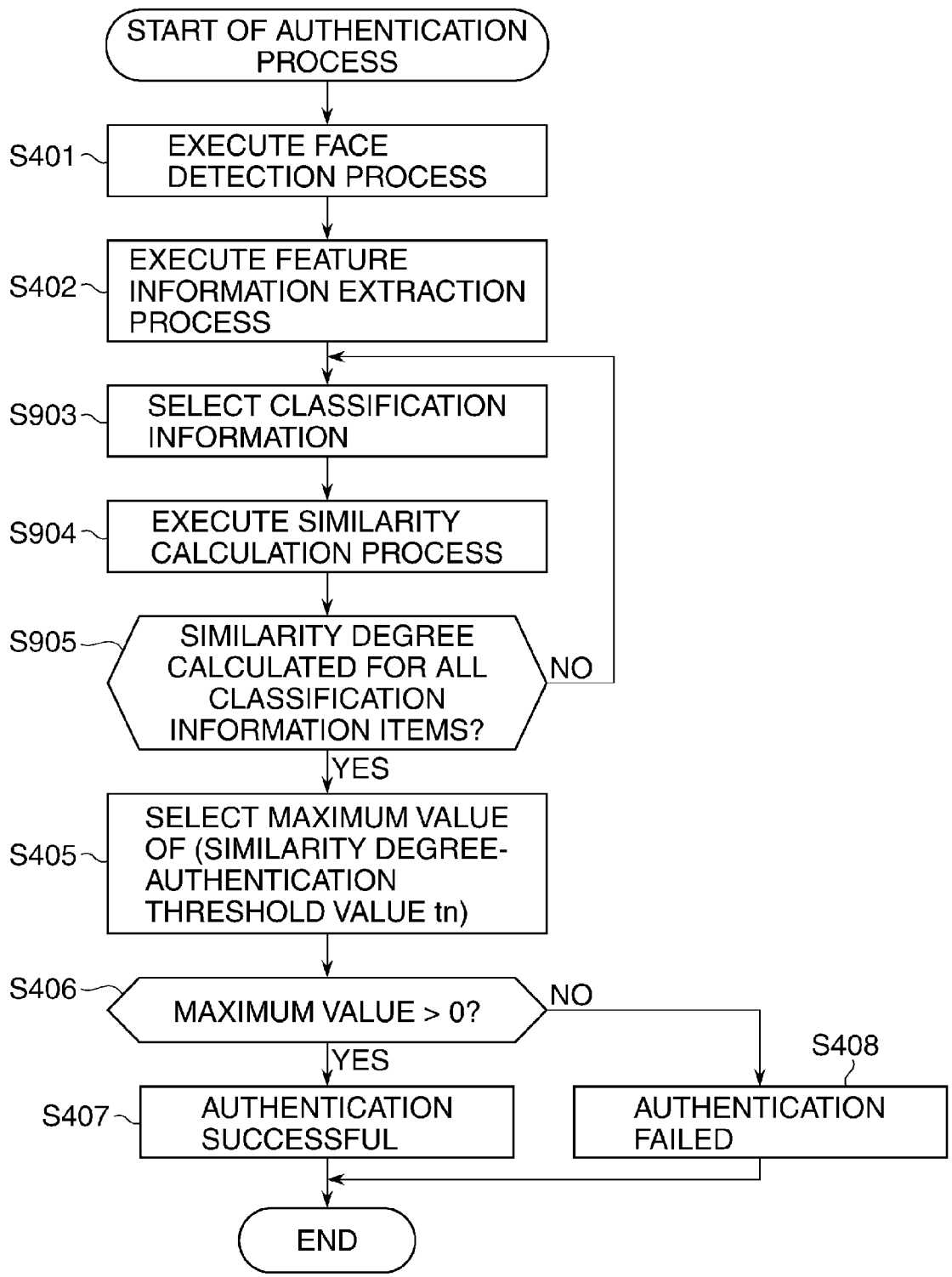
FIG. 9 is a flowchart of a personal authentication process executed by the digital camera which is the image pickup apparatus equipped with the authentication apparatus according to the second embodiment.
Figure 10:
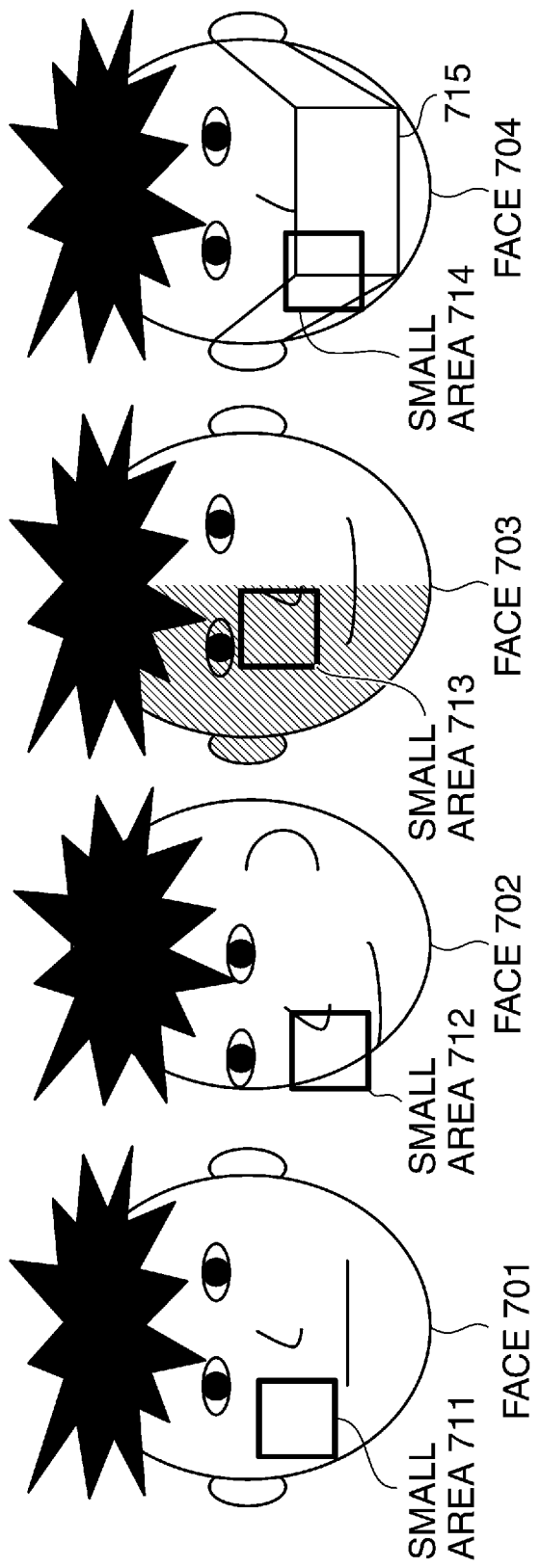
FIG. 10 is a diagram useful in explaining erroneous recognition caused by a conventional personal recognition method.

FIG. 9 is a flowchart of a personal authentication process executed by the camera equipped with the authentication apparatus according to the second embodiment. In the flowchart shown in FIG. 9, the same steps as appearing in FIG. 5 are denoted by the same reference numerals and description thereof is omitted.

When the dictionary data storage section 191 extracts, in the step S402, a to-be-authenticated object feature information item for use in personal authentication from the face image data item of the object to be authenticated, the similarity calculation processor 193 selects classification information items for similarity degree calculation from the dictionary data items registered in the dictionary data storage section 192 (step S903). Here, it is assumed that firstly, the classification information item 681 is selected from the dictionary data items shown in FIG. 7C.

Then, the similarity calculation processor 193 calculates the degree of similarity between each feature information item associated with the selected classification information item 681 and the to-be-authenticated object feature information item (step S904). Next, the similarity calculation processor 193 determines whether or not the degrees of similarity between feature information items associated with all the classification information items registered in the dictionary data storage section 192 and the to-be-authenticated object feature information item have been calculated (step S905).

If it is determined that the degrees of similarity between feature information items associated with all the classification information items registered in the dictionary data storage section 192 and the to-be-authenticated object feature information item have not been calculated (NO to the step S905), the similarity calculation processor 193 returns to the step S903 to select a next classification information, and then in the step S904, calculates the degree of similarity between each feature information item associated with the next classification information and the to-be-authenticated object feature information item.

When the degrees of similarity between feature information items associated with all the classification information items registered in the dictionary data storage section 192 and the to-be-authenticated object feature information item have been calculated (YES to the step S905), the authentication determination section 194 executes the steps S405 to S408, described with reference to FIG. 5. Note that the authentication threshold value to used in the step S405 shown in FIG. 9 becomes larger as the registration count of feature information items of the same person increases, similarly to the classification threshold value.

Now, let it be assumed that in the dictionary data shown in FIG. 7C, the degrees of similarity between the feature information items associated with the classification information item 681 and the to-be-authenticated object feature information item are represented by r961, and the degree of similarity between the classification information item 683 and the to-be-authenticated object feature information item is represented by r962. Further, the degree of similarity between the classification information item 684 and the to-be-authenticated object feature information item is represented by r963, and the degree of similarity between the classification information item 685 and the to-be-authenticated object feature information item is represented by r964.

In this case, in the step S405, the maximum value of (each similarity degree r961—the authentication threshold value t2), (the similarity degree r962—the authentication threshold value t1), (the similarity degree r963—the authentication threshold value t1), and (the similarity degree r964—the authentication threshold value t1) is selected. Then, in the step S406, the authentication determination section 194 determines whether or not the selected maximum value is larger than 0, and according to the result of the determination, determines whether or not the authentication is successful.

As described heretofore, in the second embodiment of the present invention, it is possible not only to obtain the same advantageous effects as provided by the first embodiment but also to enhance authentication accuracy even when shooting conditions undergo complex changes including environmental changes, since classification information items that classify faces of the same person based on similarity degrees are stored in association with dictionary data items.

As is apparent from the above description, in the example illustrated in FIG. 1, the system controller 150 and the face detection section 190 function as a specific area detection unit, and the system controller 150 and the feature information extraction processor 191 function as a feature information extraction unit.

Further, the similarity calculation processor 193 and the authentication determination section 194 function as an authentication unit, and the similarity calculation processor 193 and the registration information processor 195 function as a registration determination unit.

Note that in the example illustrated in FIG. 1, at least the system controller 150, the face detection section 190, the feature information extraction processor 191, the dictionary data storage section 192, the similarity calculation processor 193, the authentication determination section 194, and the registration information processor 195 constitute the authentication apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2012-181738 filed Aug. 20, 2012, which is hereby incorporated by reference herein in its entirety.

What is claimed is:

1. An authentication apparatus that includes a storage section for storing image data items each indicative of a feature of a specific area of each of a plurality of objects, and authenticates an object in an image as a specific object, using the image data item, comprising:
a specific area detection unit configured to detect a specific area of the specific object from the image;
a feature information extraction unit configured to extract a feature information item indicative of a feature of the specific area from the specific area of the specific object;
an authentication unit configured to compare the image data item and the feature information item, to authenticate the specific object according to a result of the comparison; and a registration determination unit configured, before the feature information item of the specific object is additionally registered in the storage section as the image data item, if one of the plurality of objects is selected as a selected object to which the feature information item of the specific object is to be added, to determine whether or not to additionally register the feature information item of the specific object as an image data item of the selected object, according to a degree of similarity between the image data item of the selected object and the feature information item of the specific object, wherein said registration determination unit determines that the feature information item of the specific object is additionally registered as the image data item of the selected object when the degree of similarity between the image data item of the selected object and the feature information item of the specific object is larger than a registration threshold value set in advance, and wherein the registration threshold value changes according to a registration count of the image data items of the selected object.

2. The authentication apparatus according to claim 1, wherein the registration threshold value increases as the registration count of the image data items of the selected object increases.

3. The authentication apparatus according to claim 1, wherein the image data items are registered in the storage section in a manner classified for each of the plurality of objects into groups according to the degree of similarity, and wherein said registration determination unit uses classification information items indicative of features of the groups concerning the selected object in place of the image data item, and thereby determines in which group of the selected object the feature information item of the specific object is to be additionally registered, according to degrees of similarity between the feature information item of the specific object and the classification information items.

4. The authentication apparatus according to claim 3, wherein said registration determination unit calculates for each of the groups a degree of similarity between a classification information item of each group and the feature information item of the specific object, and determines that the feature information item of the specific object is to be registered in a group indicated by a classification information item having a maximum degree of similarity out of all degrees of similarity which exceed a registration threshold value set in advance.

5. The authentication apparatus according to claim 4, wherein said registration determination unit determines, when all the degrees of similarity are not larger than the registration threshold value, that the feature information item of the specific object is to be registered in a new group associated with the selected object.

6. The authentication apparatus according to claim 4, wherein the registration threshold value changes according to a registration count of image data items of each group.

7. The authentication apparatus according to claim 6, wherein the registration threshold value increases as the registration count of image data items of the group increases.

8. The authentication apparatus according to claim 1, wherein the specific area is a face of a person.

9. A method of authentication performed by an authentication apparatus that includes a storage section for storing image data items each indicative of a feature of a specific area of each of a plurality of objects, and authenticates an object in an image as a specific object, using the image data item, comprising:

detecting a specific area of the specific object from the image;

extracting a feature information item indicative of a feature of the specific area from the specific area of the specific object;

comparing the image data item and the feature information item, to authenticate the specific object according to a result of the comparison; and determining, before the feature information item of the specific object is additionally registered in the storage section as the image data item, if one of the plurality of objects is selected as a selected object to which the feature information item of the specific object is to be added, whether or not to additionally register the feature information item of the specific object as an image data item of the selected object, according to a degree of similarity between the image data item of the selected object and the feature information item of the specific object, wherein said determining includes determining that the feature information item of the specific object is additionally registered as the image data item of the selected object when the degree of similarity between the image data item of the selected object and the feature information item of the specific object is larger than a registration threshold value set in advance, and wherein the registration threshold value changes according to a registration count of the image data items of the selected object.

10. A non-transitory computer-readable storage medium storing a computer-executable control program for causing a computer to execute a method of controlling an authentication apparatus that includes a storage section for storing image data items each indicative of a feature of a specific area of each of a plurality of objects, and authenticates an object in an image as a specific object, using the image data item, wherein the method comprises:

detecting a specific area of the specific object from the image;

extracting a feature information item indicative of a feature of the specific area from the specific area of the specific object;

comparing the image data item and the feature information item, to authenticate the specific object according to a result of the comparison; and determining, before the feature information item of the specific object is additionally registered in the storage section as the image data item, if one of the plurality of objects is selected as a selected object to which the feature information item of the specific object is to be added, whether or not to additionally register the feature information item of the specific object as an image data item of the selected object, according to a degree of similarity between the image data item of the selected object and the feature information item of the specific object, wherein said determining includes determining that the feature information item of the specific object is additionally registered as the image data item of the selected object when the degree of similarity between the image data item of the selected object and the feature information item of the specific object is larger than a registration threshold value set in advance, and wherein the registration threshold value changes according to a registration count of the image data items of the selected object.

11. An authentication apparatus, comprising:
a storage unit for storing image data items each indicative of a feature of a specific area of each of a plurality of specific objects;
an authentication unit configured to compare the image data item stored and a feature information item indicative of a feature of the specific area of the specific object of before registration, to authenticate the specific object according to a result of the comparison of the feature; and
a registration determination unit configured to compare a degree of similarity between an image data item of an object selected from the plurality of specific objects and the feature information item of before registration with a registration threshold value, to determine whether or not to additionally register the feature information item of before registration as an image data item of the selected object, according to a result of the comparison of the similarity,
wherein the registration threshold value changes according to a registration count of the image data items of the selected object.

12. The authentication apparatus according to claim 11, wherein the registration threshold value increases as the registration count of the image data items of the selected object increases.

13. The authentication apparatus according to claim 11, wherein the specific object includes an face image.

14. A method of authentication performed by an authentication apparatus that includes a storage unit for storing image data items each indicative of a feature of a specific area of each of a plurality of specific objects, comprising:
comparing the image data item stored with a feature information item indicative of a feature of the specific area of the specific object of before registration, to authenticate the specific object according to a result of the comparison of the feature; and
comparing a degree of similarity between an image data item of an object selected from the plurality of specific objects and the feature information item of before registration with a registration threshold value, to determine whether or not to additionally register the feature information item of before registration as an image data item of the selected object, according to a result of the comparison of the similarity,
wherein the registration threshold value changes according to a registration count of the image data items of the selected object.

15. The method according to claim 14, wherein the registration threshold value increases as the registration count of the image data items of the selected object increases.

16. A non-transitory computer-readable storage medium storing a computer-executable control program for causing a computer to execute a method of controlling an authentication apparatus that includes a storage unit for storing image data items each indicative of a feature of a specific area of each of a plurality of specific objects,
wherein the method comprises:
comparing the image data item stored and a feature information item indicative of a feature of the specific area of the specific object of before registration, to authenticate the specific object according to a result of the comparison of the feature; and
comparing a degree of similarity' between an image data item of an object selected from the plurality of specific objects and the feature information item of before registration with a registration threshold value, to determine whether or not to additionally register the feature information item of before registration as an image data item of the selected object, according to a result of the comparison of the similarity,
wherein the registration threshold value changes according to a registration count of the image data items of the selected object.

17. The storage medium according to claim 16, wherein the registration threshold value increases as the registration count of the image data items of the selected object increases.

18. An image recognition apparatus, comprising:
a storage unit for storing characteristic data for recognizing a predetermined image;
a data amount changing unit configured to change an amount of the characteristic data stored in the storage unit for recognizing the predetermined image; and
a recognizing unit configured to recognize the predetermined image by comparing the characteristic data with a target image and by determining that the target image is recognized as the predetermined image if a result of the comparison reaches a predetermined threshold level; and
a threshold level changing unit configured to change the threshold level so as to recognize the predetermined image according to the amount of the characteristic data stored in the storage unit.

19. The image recognition apparatus according to claim 18, wherein data amount changing unit changes a number of registered characteristic data stored in the storage unit.

20. The image recognition apparatus according to claim 18, wherein the characteristic data includes partial image data for recognizing the predetermined image.

21. The image recognition apparatus according to claim 18, wherein the threshold level changing unit increases the threshold level according to the increase of the amount of the characteristic data stored in the storage unit.

22. The image recognition apparatus according to claim 18, wherein the predetermined image includes a face image.

23. A method of image recognition performed by an image recognition apparatus, comprising:
storing characteristic data for recognizing a predetermined image in a storage unit;
changing an amount of the characteristic data stored in the storage unit for recognizing the predetermined image; and
recognizing the predetermined image by comparing the characteristic data with a target image and by determining that the target image is recognized as the predetermined image if a result of the comparison reaches a predetermined threshold level; and
changing the threshold level so as to recognize the predetermined image according, to the amount of the characteristic data stored in the storage unit.

24. The method according to claim 23, wherein the threshold level is increased according to the increase of the amount of the characteristic data stored in the storage unit.

25. A non-transitory computer-readable storage medium storing a computer-executable control program for causing a computer to execute a method of controlling an image recognition apparatus,
wherein the method comprises:

storing characteristic data for recognizing a predetermined image in a storage unit;

changing an amount of the characteristic data stored in the storage unit for recognizing the predetermined image; and recognizing the predetermined image by comparing the characteristic data with a target image and by determining that the target image is recognized as the predetermined image if a result of the comparison reaches a predetermined threshold level; and changing the threshold level so as to recognize the predetermined image according to the amount of the characteristic data stored in the storage unit.

26. The storage medium according to claim 25, wherein the threshold level is increased according to the increase of the amount of the characteristic data stored in the storage unit.

* * * * *